(12) United States Patent
Kawabata et al.

(10) Patent No.: US 9,389,474 B2
(45) Date of Patent: Jul. 12, 2016

(54) LIQUID CRYSTAL PANEL

(71) Applicant: Sharp Kabushiki Kaisha, Osaka-shi, Osaka (JP)

(72) Inventors: Masae Kawabata, Osaka (JP); Fumikazu Shimoshikiryoh, Osaka (JP); Yuki Yamashita, Osaka (JP); Akihiro Shohraku, Osaka (JP)

(73) Assignee: SHARP KABUSHIKI KAISHA, Osaka-shi, Osaka (JP)

( * ) Notice: Subject to any disclaimer, the term of this patent is extended or adjusted under 35 U.S.C. 154(b) by 0 days.

(21) Appl. No.: 14/475,791

(22) Filed: Sep. 3, 2014

(65) Prior Publication Data

US 2014/0368762 A1 Dec. 18, 2014

Related U.S. Application Data

(63) Continuation of application No. 13/318,879, filed as application No. PCT/JP2010/057892 on May 10, 2010, now Pat. No. 8,854,562.

(30) Foreign Application Priority Data

May 21, 2009 (JP) ................................. 2009-123630

(51) Int. Cl.
  *G02F 1/00* (2006.01)
  *G02B 5/00* (2006.01)
  (Continued)

(52) U.S. Cl.
  CPC ........ *G02F 1/136213* (2013.01); *G02F 1/1339* (2013.01); *G02F 1/13439* (2013.01); *G02F 1/133514* (2013.01); *G09G 3/3655* (2013.01); *H04N 5/66* (2013.01); *G02F 1/13624* (2013.01); *G02F 2001/134345* (2013.01);
  (Continued)

(58) Field of Classification Search
  CPC ............ G02F 1/00; G02F 1/1343; G08B 5/00
  USPC ....................................................... 349/36–39
  See application file for complete search history.

(56) References Cited

U.S. PATENT DOCUMENTS 6,958,791 B2 * 10/2005 Shimoshikiryo ............... 349/85
7,884,890 B2 *  2/2011 Shimoshikiryoh et al. ..... 349/39
(Continued)

FOREIGN PATENT DOCUMENTS

EP   2 407 822 A1   1/2012
JP   10-213812      8/1998
(Continued)

OTHER PUBLICATIONS

International Search Report for PCT/JP2010/057892, mailed Jun. 22, 2010.
(Continued)

*Primary Examiner* — Kaveh C Kianni
(74) *Attorney, Agent, or Firm* — Nixon & Vanderhye, P.C.

(57) ABSTRACT

A liquid crystal panel (10) includes a plurality of pixels arranged in a matrix pattern having rows and columns. A plurality of Cs bus lines (43c) as storage capacitor lines are routed in the row direction of the liquid crystal panel (10). A plurality of branch lines (310) are routed in the column direction across a pixel region (10a). The branch lines (310) are connected to the Cs bus lines (43c) so that control signals are sent to storage capacitors from the branch lines (310) through the Cs bus lines (43c).

38 Claims, 28 Drawing Sheets

(51) Int. Cl.
  *G09G 3/30* (2006.01)
  *G08C 19/36* (2006.01)
  *G11C 13/04* (2006.01)
  *G02F 1/1362* (2006.01)
  *H04N 5/66* (2006.01)
  *G02F 1/1335* (2006.01)
  *G02F 1/1339* (2006.01)
  *G09G 3/36* (2006.01)
  *G02F 1/1343* (2006.01)

(52) U.S. Cl.
  CPC ..... *G09G 3/3614* (2013.01); *G09G 2300/0426* (2013.01); *G09G 2300/0443* (2013.01); *G09G 2300/0447* (2013.01); *G09G 2300/0847* (2013.01); *G09G 2300/0876* (2013.01); *G09G 2320/0204* (2013.01); *G09G 2320/028* (2013.01)

(56) References Cited

U.S. PATENT DOCUMENTS

| | | | |
|---|---|---|---|
| 8,184,221 B2* | 5/2012 | Inoue et al. | 349/38 |
| 8,362,988 B2* | 1/2013 | Hsieh et al. | 345/87 |
| 8,471,793 B2 | 6/2013 | Irie et al. | |
| 2005/0122441 A1* | 6/2005 | Shimoshikiryoh | 349/38 |
| 2006/0256271 A1* | 11/2006 | Shimoshikiryo | 349/144 |
| 2007/0182909 A1 | 8/2007 | Kim et al. | |
| 2008/0106657 A1* | 5/2008 | Kitayama et al. | 349/37 |
| 2008/0158203 A1* | 7/2008 | Irie et al. | 345/204 |
| 2009/0002585 A1 | 1/2009 | Shimoshikiryoh et al. | |
| 2009/0051641 A1* | 2/2009 | Irie et al. | 345/96 |
| 2009/0065778 A1* | 3/2009 | Tsubata et al. | 257/59 |
| 2009/0135111 A1* | 5/2009 | Yamamoto et al. | 345/76 |
| 2009/0167660 A1* | 7/2009 | Wang et al. | 345/89 |
| 2010/0097535 A1* | 4/2010 | Inoue et al. | 349/38 |
| 2010/0118012 A1* | 5/2010 | Irie et al. | 345/211 |
| 2011/0315991 A1 | 12/2011 | Sugihara et al. | |

FOREIGN PATENT DOCUMENTS

| | | |
|---|---|---|
| JP | 10-232412 | 9/1998 |
| JP | 10-239699 | 9/1998 |
| JP | 2001-281690 | 10/2001 |
| JP | 2003-43948 | 2/2003 |
| JP | 2008-250176 A | 10/2008 |
| WO | 2006/070829 A1 | 7/2006 |
| WO | 2006/098448 A1 | 9/2006 |
| WO | 2006/098449 | 9/2006 |

OTHER PUBLICATIONS

Supplementary European Search Report issued in Application No. EP 10777673 dated Mar. 4, 2013.

* cited by examiner

LIQUID CRYSTAL PANEL

This application is a continuation of U.S. patent application Ser. No. 13/318,879, filed Nov. 4, 2011, pending, which is the National Phase Application of PCT Application PCT/JP2010/057892, filed May 10, 2010, which claims priority of Japanese Patent Application 2009-123630, filed May 21, 2009, the entire contents of each of which are hereby incorporated by reference.

TECHNICAL FIELD

The present invention relates to a liquid crystal panel in which a plurality of pixels are arranged in a matrix pattern having rows and columns. Note that this application claims priority under the Paris Convention or laws and regulations of destination countries to Japanese Patent Application No. 2009-123630 filed on May 21, 2009. The content of the basic application is incorporated herein by reference.

BACKGROUND ART

As such a liquid crystal panel, the present inventors have proposed what is known as multi-pixel driving (referred to also as "area coverage modulation display", "area coverage modulation driving" or "multi-pixel display") techniques in, for example, WO2006/098449 (International Publication WO06/098449 pamphlet (Patent Document 1)), etc.

In such a liquid crystal panel, a plurality of pixels are arranged in a matrix pattern having rows and columns. With this technique, two subordinate pixels for making the effective voltages to be applied to the liquid crystal layer different from each other are provided within one pixel. A different storage capacitor is provided for each subordinate pixel. A vibration voltage is applied to the storage capacitor. With such multi-pixel driving, brightness/darkness is determined for each subordinate pixel by inverting the polarity of the voltage supplied to the storage capacitor.

In this case, the storage capacitors of the subordinate pixels are connected to a plurality of storage capacitor lines (referred to also as "Cs bus lines", etc.) routed in the row direction, for example. The storage capacitor lines are connected to stem lines (referred to also as "Cs stem lines") routed on both sides in the row direction. Then, control signals are sent to the storage capacitors through the stem lines and the storage capacitor lines.

The publication states that waveform rounding (rounding of waveforms) occurs, due to electric resistance, etc., for control signals of the storage capacitors (e.g., WO2006/098449, Paragraphs 0120-0121). For the problem of the waveform rounding, the publication discloses that it is improved by increasing the vibration frequency of the control signals given to the storage capacitor lines.

CITATION LIST

Patent Document

Patent Document 1: International Publication WO06/098449 pamphlet

SUMMARY OF THE INVENTION

Technical Problem

Now, the screen size of a liquid crystal display device has been increased in applications such as displays for TV sets. As the screen size increases, the length of the wiring path to the storage capacitors described above increases. Thus, the phenomenon of waveform rounding described above is also likely to occur. For applications such as displays for TV sets, the front surface of the panel is surrounded by a bezel-like frame. In order to achieve a smaller display width for the same screen size, there is a demand for reducing the width of the bezel-like frame (demand for thinning the bezel). One method for reducing the phenomenon of waveform rounding described above is to thicken the stem lines provided on both sides in the row direction of the liquid crystal panel so as to reduce the resistance of the stem lines. However, thickening the stem lines contradicts the demand for thinning the bezel. When the stem lines are thinned in order to address the demand for thinning the bezel, the resistance in the wiring path to the storage capacitors increases, and it is more likely that the phenomenon of waveform rounding occurs. In view of this, the present invention proposes a novel structure for lines for sending control signals to storage capacitors of the liquid crystal display device.

Solution to the Problem

A liquid crystal panel of the present invention includes a plurality of pixels arranged in a matrix pattern having rows and columns. A storage capacitor is provided in each pixel. A plurality of storage capacitor lines are routed in the row direction and connected to the storage capacitors arranged in the row direction. A plurality of branch lines are routed in the column direction across a pixel region where the plurality of pixels are arranged. The branch lines are connected to a control signal supply section for sending control signals to the storage capacitors from the branch lines through the storage capacitor lines. With this liquid crystal panel, it is not always necessary to provide stem lines in opposite edge portions in the row direction, and even where stem lines are provided, the stem lines can be made thinner. Therefore, it is possible to reduce the space in the opposite edge portions in the row direction of the liquid crystal panel (thin the bezel). A plurality of branch lines can be provided across the pixel region. Therefore, it is possible to shorten the wiring path to each storage capacitor and to suppress the resistance of the wiring path to the storage capacitor to be low. Thus, it is possible to improve the "waveform rounding" of the control signal of the storage capacitor. Note that the term "branch line" as used herein is defined based on the description of the present specification.

In this case, the liquid crystal panel may include a plurality of stem lines routed in at least one edge portion in the row direction, with the storage capacitor lines connected to the stem lines. In this case, it is preferred that the stem lines are connected to the control signal supply section, and control signals are sent to the storage capacitors from the stem lines through the storage capacitor lines. The liquid crystal panel may include a plurality of horizontal stem lines routed in an edge portion in the column direction, with the branch lines connected to the horizontal stem lines.

The plurality of branch lines may be grouped into a plurality of groups, and may be connected to the control signal supply section so that the same control signal is sent to branch lines belonging to the same group. In this case, it is preferred that the plurality of storage capacitor lines are each connected to branch lines belonging to one group. In this case, the liquid crystal panel may include a plurality of stem lines routed in at least one edge portion in the row direction. It is preferred that each storage capacitor line is connected to one of the plurality of stem lines; and the same control signal as the control signal sent to the branch lines belonging to one group to which the storage capacitor line is connected is sent to the stem line by the control signal supply section. Moreover, the liquid crystal panel may include a plurality of horizontal stem lines routed in an edge portion in the column direction. In this case, it is preferred that the branch lines belonging to one group are connected to one horizontal stem line that is different from horizontal stem lines to which branch lines of other groups are connected.

The branch lines may be routed evenly across different pixels. For example, where each pixel includes R, G and B sub-pixels, the branch lines may be routed so as to pass through R sub-pixels of the R, G and B sub-pixels. The branch lines may be routed so as to pass through G sub-pixels of the R, G and B sub-pixels. The branch lines may be routed so as to pass through B sub-pixels of the R, G and B sub-pixels.

The liquid crystal panel may include: a liquid crystal layer; a pair of substrates with the liquid crystal layer interposed therebetween; a counter electrode formed on one of the pair of substrates; and a pixel electrode formed on the other substrate opposing the counter electrode. In this case, two branch lines that receive a pair of control signals whose signal voltage changes are of opposite directions and of an equal amount may be routed so as to pass through an area where the pixel electrode is formed. Thus, the influences of the capacitances (capacitive couplings) formed between the branch lines and the pixel electrode are canceled out between the two branch lines, and it is possible to reduce the influence from the capacitances formed between the branch lines and the pixel electrode.

In a case where a plurality of branch lines are routed so as to pass through an area where the pixel electrode of the pixel is formed, capacitances (capacitive couplings) formed between the branch lines and the pixel electrode may be made equal to each other. Thus, if the plurality of branch lines receive a pair of control signals whose signal voltage changes are of opposite directions and of an equal amount, there is a significant effect of canceling out the influences of the capacitances (capacitive couplings) formed between the branch lines and the pixel electrode. A largest value of a plurality of capacitances formed between the branch lines and the pixel electrode may be less than or equal to twice a smallest value thereof. Also in this case, if the plurality of branch lines receive a pair of control signals whose signal voltage changes are of opposite directions and of an equal amount, the influences of the capacitances (capacitive couplings) formed between the branch lines and the pixel electrode are canceled out, thereby reducing the influence from the capacitances (capacitive couplings) formed between the branch lines and the pixel electrode. Note that more preferably, the largest value of the plurality of capacitances is less than or equal to 1.5 times the smallest value thereof.

Where a plurality of branch lines are routed so as to pass through an area where the pixel electrode of the pixel is formed, areas over which the branch lines as projected onto the pixel electrode overlap the pixel electrode may be made equal to each other. For example, it is preferred that the areas over which the branch lines overlap the pixel electrode as viewed in a plan view of the substrate on which the pixel electrode is formed are equal between the plurality of branch lines. Thus, if the plurality of branch lines receive a pair of control signals whose signal voltage changes are of opposite directions and of an equal amount, there is a significant effect of canceling out the influences of the capacitances (capacitive couplings) formed between the branch lines and the pixel electrode. A plurality of branch lines may be routed so as to pass through an area where the pixel electrode of the pixel is formed; and a largest value of areas over which the branch lines as projected onto the pixel electrode overlap the pixel electrode may be less than or equal to twice a smallest value thereof. Also in this case, if the plurality of branch lines receive a pair of control signals whose signal voltage changes are of opposite directions and of an equal amount, the influences of the capacitances (capacitive couplings) formed between the branch lines and the pixel electrode are canceled out, thereby reducing the influence from the capacitances (capacitive couplings) formed between the branch lines and the pixel electrode. Note that more preferably, the largest value of the areas over which the branch lines as projected onto the pixel electrode overlap the pixel electrode is less than or equal to 1.5 times the smallest value thereof.

As a different embodiment, the branch lines are routed so as to pass through an area where the pixel electrode of the pixel is formed; and $Cx/(Clc+Cs+Cx) \leq 0.2$ holds, where Clc is a capacitance formed by the counter electrode and the pixel electrode, Cs is a capacitance of the storage capacitor, and Cx is a capacitance formed between the branch line and the pixel electrode. In this case, it is possible to relatively reduce the influence due to the capacitance formed between the branch line and the pixel electrode to such a degree that there is no problem in terms of the display quality. Note that where the branch lines are routed so as to pass through an area where the pixel electrode of the pixel is formed, it is preferred that $Cx/(Clc+Cs+Cx) \leq 0.2$ holds for each of the capacitances Cx formed between the branch lines and the pixel electrode.

A gap may be formed between the pixel electrodes and the branch line may be routed so as to pass through the gap between the pixel electrodes. In this case, it is possible to suppress the occurrence of the capacitive coupling.

Each pixel may include subordinate pixels having different brightness levels. In this case, it is preferred that the subordinate pixels having different brightness levels include storage capacitors connected to different storage capacitor lines. It is preferred that the storage capacitors provided in the subordinate pixels having different brightness levels receive a pair of control signals whose signal voltage changes are of opposite directions and of an equal amount through the different storage capacitor lines.

DESCRIPTION OF EMBODIMENTS

A liquid crystal panel according to an embodiment of the present invention will now be described with reference to the drawings.

Figure 13:
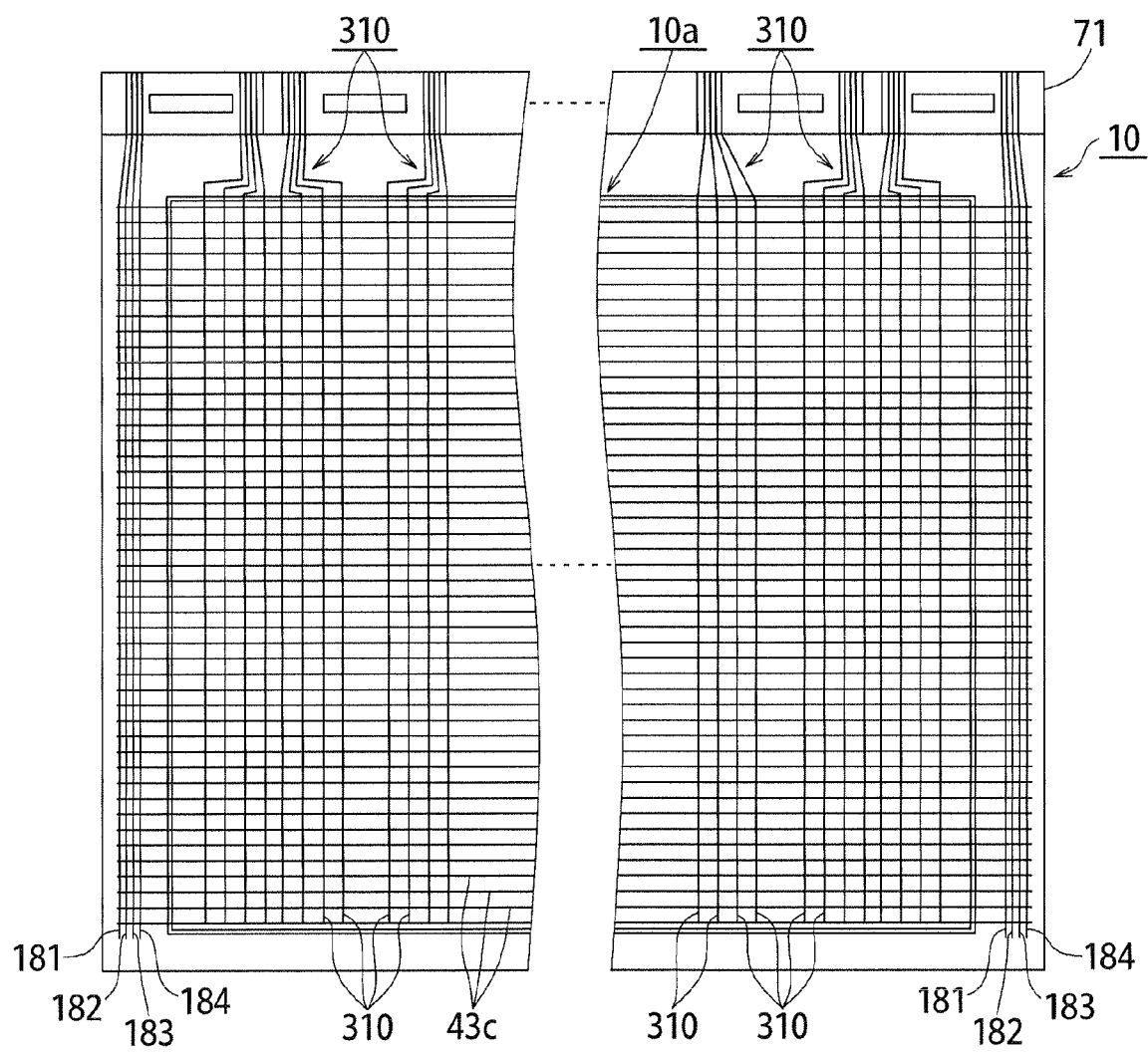
FIG. 13 A diagram showing a circuit configuration of a liquid crystal panel according to an embodiment of the present invention.

As shown in FIG. 13, a liquid crystal panel 10 includes a plurality of branch lines 310 routed in the column direction across a pixel region 10a in which a plurality of Cs bus lines 43c (storage capacitor lines) are routed in the row direction. The branch lines 310 are connected to the Cs bus lines 43c so that control signals are sent to the storage capacitors from the branch lines 310 through the Cs bus lines 43c. By thus forming a plurality of wiring paths for sending the control signals c from the branch lines 310 to the storage capacitors Cs through the Cs bus lines 43c, the resistance of a wiring path for sending the control signal c to the storage capacitor Cs is reduced, and the "waveform rounding" of the control signal c sent to the storage capacitor Cs is suppressed to be small. With the liquid crystal panel 10, it is possible to thin the bezel of the liquid crystal display device. The details of the liquid crystal panel 10 will now be described.

Here, first, a structure of a liquid crystal display device having a liquid crystal panel 10 where the branch lines 310 are not formed (see FIG. 11) will be described schematically, and the "waveform rounding" occurring on the Cs bus line 43c (storage capacitor line) will be described. Then, a liquid crystal display device (see FIG. 13) where the branch lines 310 are formed will be described, and how the "waveform rounding" is improved and how the bezel is thinned will be described. Note that the configuration of the liquid crystal display device illustrated herein is merely an example, and the specific configuration of the liquid crystal display device is not limited to the following embodiment. The drawings do not necessarily reflect the configuration of an actual product. Members or portions serving substantially the same function are denoted by the same reference numerals as appropriate. Numbers and characters in parentheses attached to the same reference numeral are used for the distinction between a plurality of members or portions serving the same function.

Figure 1:
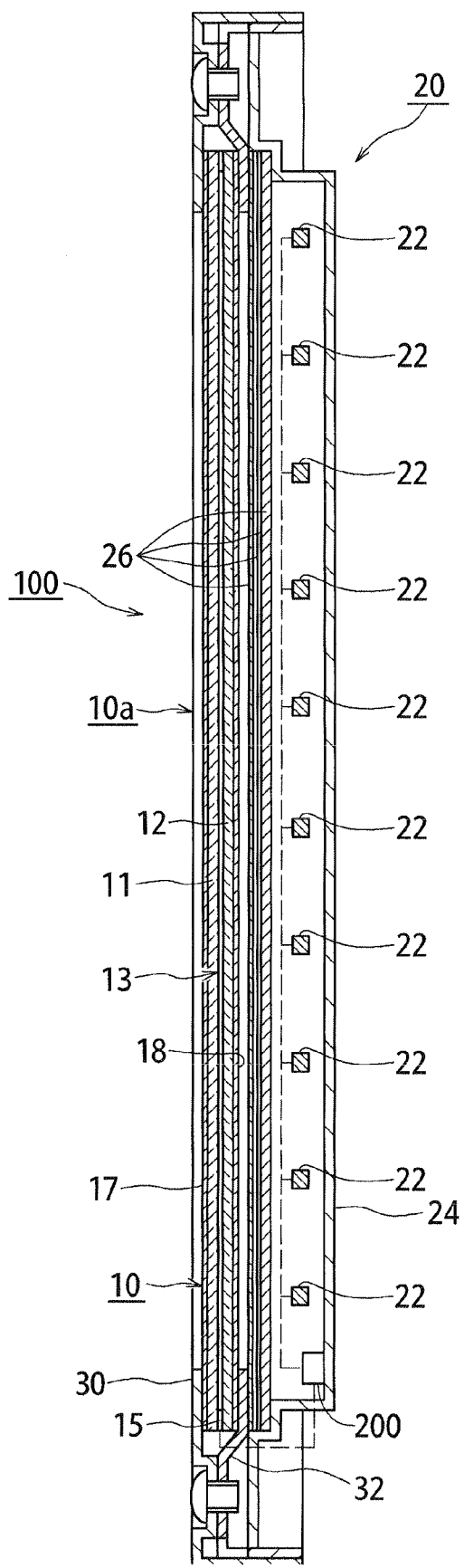
FIG. 1 A vertical cross-sectional view of a liquid crystal display device.

FIG. 1 schematically shows a cross-sectional configuration of a liquid crystal display device 100. The liquid crystal display device 100 includes the liquid crystal panel 10 and a backlight 20 as shown in FIG. 1. The liquid crystal panel 10 generally has a rectangular shape as a whole, and is formed by a pair of light-transmissive substrates 11 and 12 (glass substrates). In this embodiment, the front side one of the substrates 11 and 12 is a color filter substrate 11 (CF substrate), and the rear side one is an array substrate 12 (TFT substrate).

In this embodiment, as shown in FIG. 1, the color filter substrate 11 and the array substrate 12 each have the pixel region 10a. Herein, the pixel region 10a is a region where pixels are formed, and is referred to also as a display region. The color filter substrate 11 and the array substrate 12 are arranged so as to oppose each other. A sealant 15 is provided between the color filter substrate 11 and the array substrate 12 so as to surround the pixel region 10a along its periphery (outer peripheral portion) in the circumferential direction.

A liquid crystal layer 13 is provided between the color filter substrate 11 and the array substrate 12. The liquid crystal layer 13 includes a liquid crystal material including liquid crystal molecules. As a voltage is applied between the color filter substrate 11 and the array substrate 12, the alignment direction of the liquid crystal molecules is operated to change the optical characteristics of the liquid crystal material. The sealant 15 seals the liquid crystal material of the liquid crystal layer 13.

Figure 2:
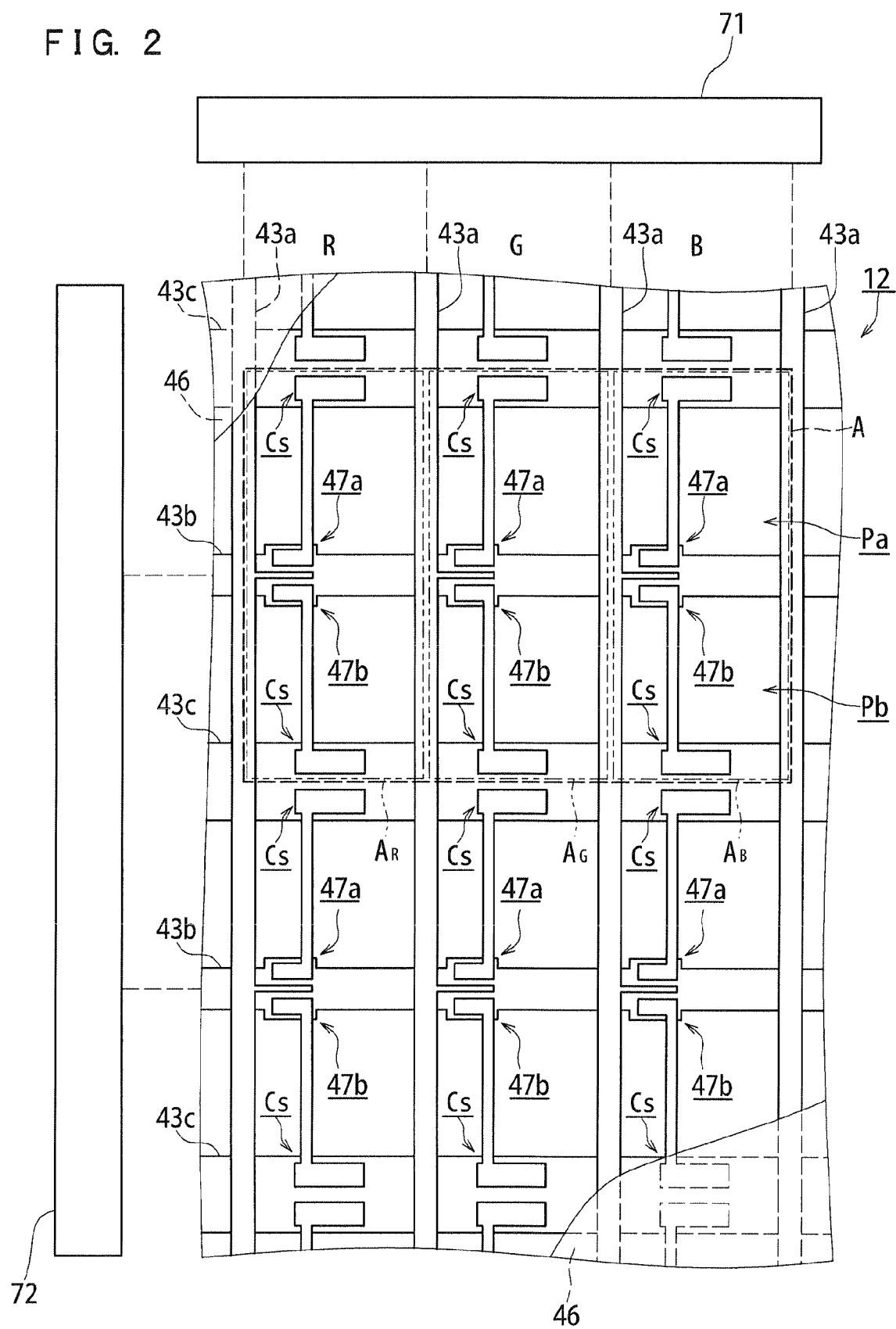
FIG. 2 A plan view showing an array substrate of a liquid crystal panel.
Figure 3:
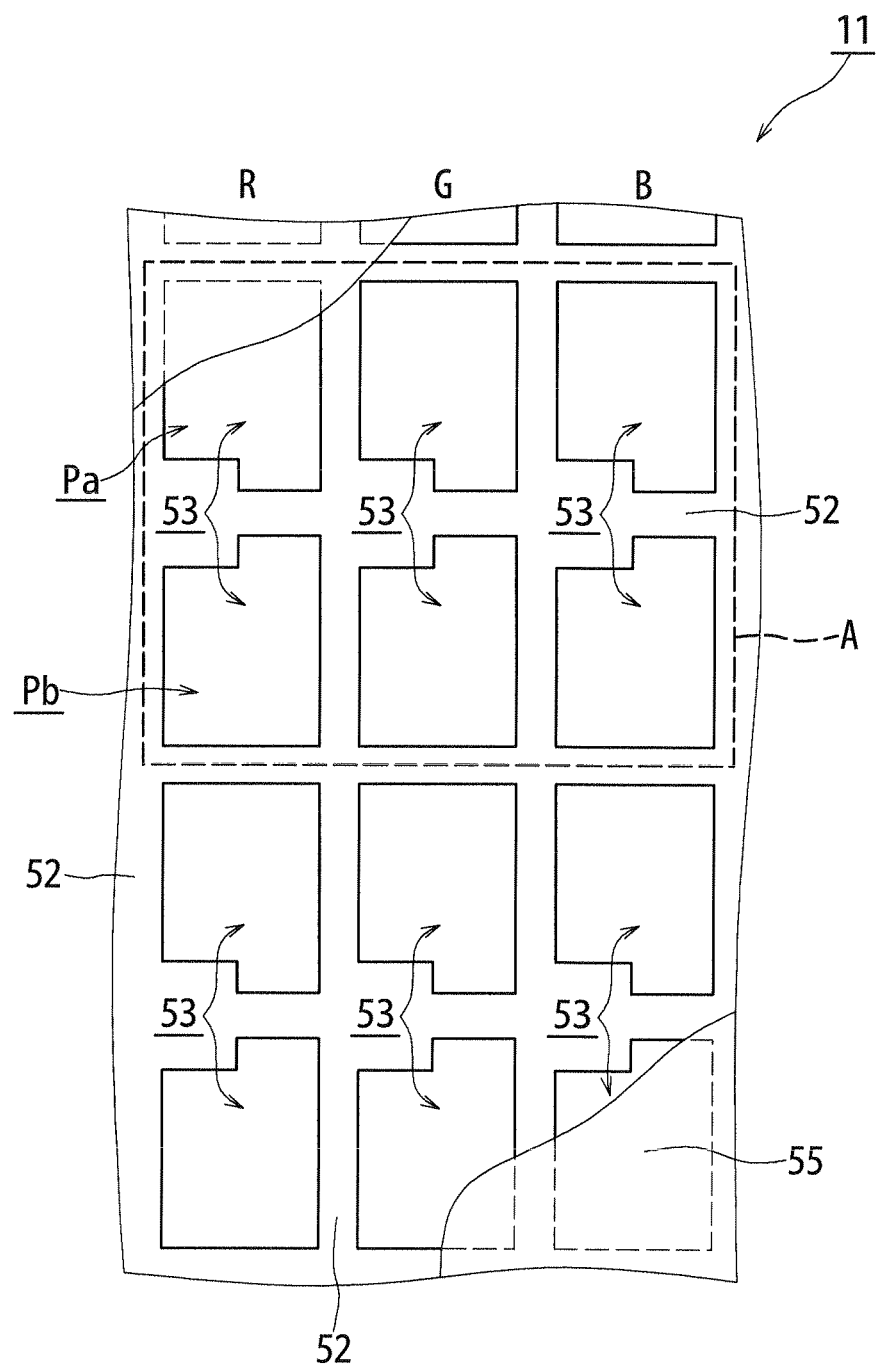
FIG. 3 A plan view showing a color filter substrate of a liquid crystal panel.
Figure 4:
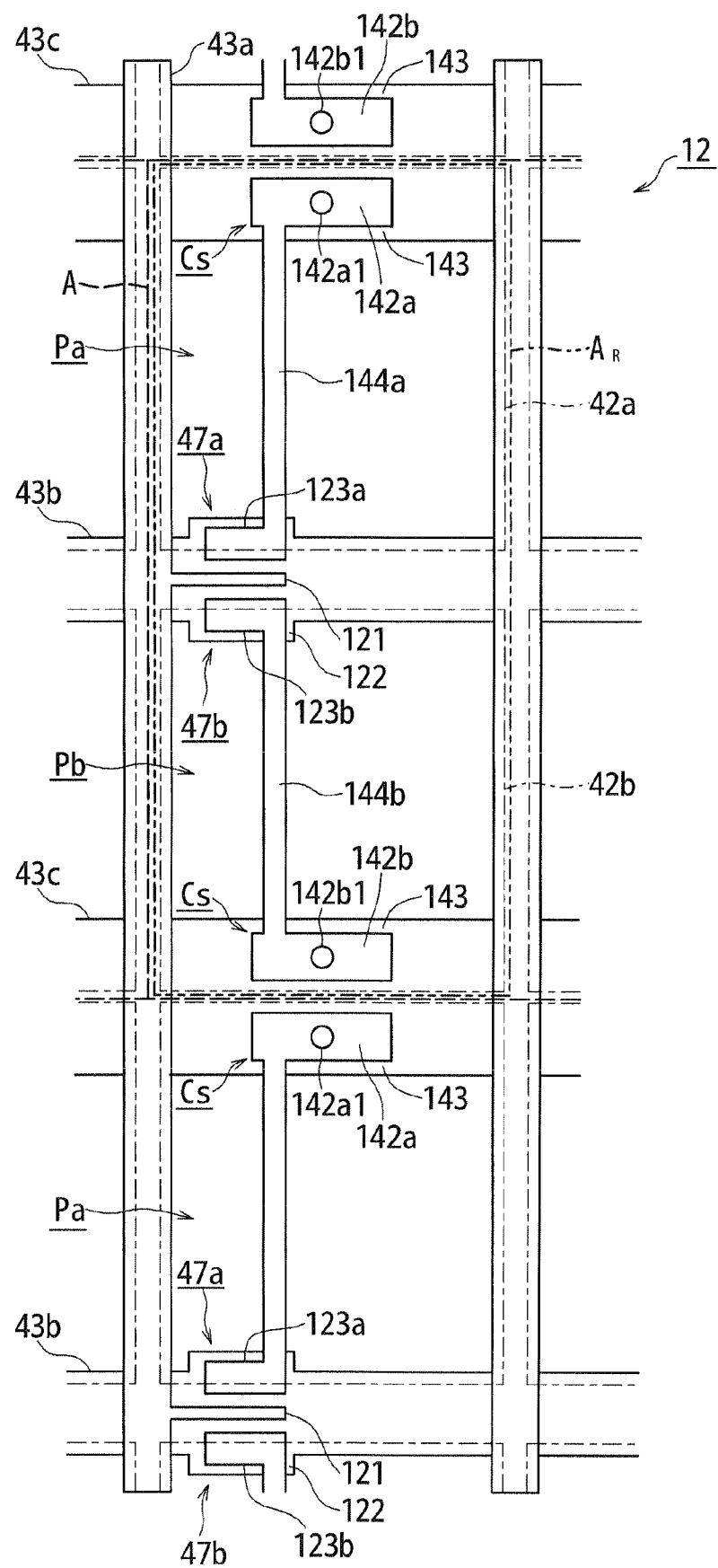
FIG. 4 A plan view showing a sub-pixel of a liquid crystal panel.
Figure 5:
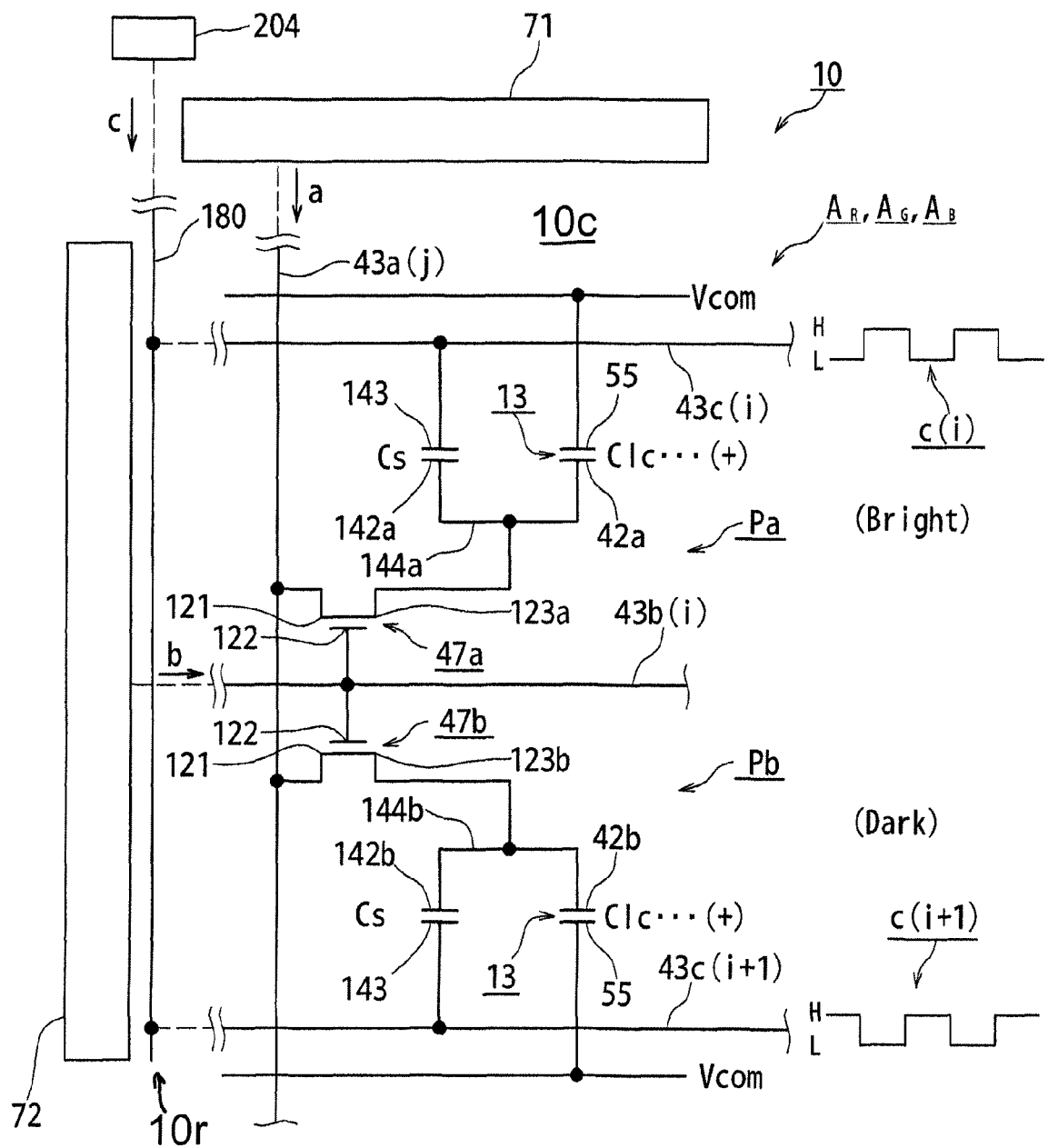
FIG. 5 A diagram showing a circuit configuration of a sub-pixel of a liquid crystal panel.

The array substrate 12 and the color filter substrate 11 will now be described in this order. FIGS. 2 and 3 show the pixel region 10a of the liquid crystal panel 10 on an enlarged scale. FIG. 2 shows a plan view of a pixel region portion of the array substrate 12, and FIG. 3 shows a plan view of a pixel region portion of the color filter substrate 11. The region surrounded by broken line A in FIGS. 2 and 3 denotes a region forming one pixel of the liquid crystal panel 10. The liquid crystal panel 10 includes pixels A shown in FIGS. 2 and 3 arranged in a matrix pattern having rows and columns. FIG. 4 is a plan view showing one sub-pixel $A_R$ of the pixel A on an enlarged scale. FIG. 5 is a circuit diagram showing a configuration of the sub-pixel $A_R$, $A_G$, $A_B$ of the pixel A. Note that FIG. 5 shows a circuit configuration of one sub-pixel located at $i^{th}$ row and $j^{th}$ column (i,j) of the liquid crystal panel 10.

In this embodiment, the array substrate 12 includes pixel electrodes 42a and 42b, bus lines 43a to 43c (bus lines), an alignment film 46 (vertical alignment film), and thin film transistors 47a and 47b (TFTs) formed on the front side (the liquid crystal layer 13 side) of a glass substrate as shown in FIGS. 2 and 4. The pixel electrodes 42a and 42b are made of ITO (indium tin oxide) which is a transparent conductive material. Voltages according to the image are supplied to these pixel electrodes 42a and 42b at a predetermined timing via the bus lines 43a to 43c and the thin film transistors 47a and 47b (see FIG. 2). The pixel electrodes 42a and 42b and the bus lines 43a to 43c (see FIG. 2) are routed with an insulating layer interposed. The alignment film 46 made of polyimide, or the like, is formed on the array substrate 12. A rubbing treatment is performed on the surface of the alignment film 46 so as to determine the alignment direction of the liquid crystal molecules in the absence of an applied voltage. In this embodiment, the array substrate 12 includes the storage capacitors Cs. The structure of the storage capacitors Cs will later be described in detail.

The color filter substrate 11 includes a black matrix 52, color filters 53, a counter electrode 55 and an alignment film 56 (vertical alignment film) formed on the rear side (the liquid crystal layer 13 side) of a glass substrate as shown in FIG. 3. The black matrix 52 is formed by a metal such as Cr (chromium) so that light does not pass through a region between pixels. There are three colors of color filters 53, i.e., red (R), green (G) and blue (B). One of the red (R), green (G) and blue (B) color filters opposes one of the R, G and B pixel electrodes 42a and 42b of the array substrate 12 as shown in FIGS. 2 and 3. The counter electrode 55 made of ITO (indium tin oxide) is formed under the black matrix 52 and the color filter 53 (the side opposing the array substrate 12). An alignment film (not shown) is formed under the counter electrode 55. A rubbing treatment is performed also on the surface of this alignment film (not shown).

Moreover, spherical or columnar spacers (not shown) are interposed between the color filter substrate 11 and the array substrate 12. The spacers are for example formed by plastic, glass, or the like. The gap between the color filter substrate 11 and the array substrate 12 is held by the sealant 15 described above and the spacers, thereby maintaining the gap of the liquid crystal layer 13.

As shown in FIG. 1, polarizer plates 17 and 18 are attached to the front side of the color filter substrate 11 and the rear side of the array substrate 12, respectively. This embodiment is directed to a liquid crystal panel in which the alignment films 46 and 56 are formed by vertical alignment films as described above (a liquid crystal panel of a so-called vertical alignment mode). With a liquid crystal panel of the vertical alignment mode, the polarization axes of the two polarizer plates 17 and 18 are orthogonal to each other. In this embodiment, a bezel 30 is attached to the front side of the liquid crystal panel 10 as shown in FIG. 1. A frame 32 is attached to the rear side of the liquid crystal panel 10. The bezel 30 and the frame 32 support the liquid crystal panel 10. Moreover, the frame 32 supports the periphery around an area corresponding to the pixel region 10a of the liquid crystal panel 10. The frame 32 has an opening across the area corresponding to the pixel region 10a of the liquid crystal panel 10. The backlight 20 of the liquid crystal display device 100 is attached to the rear side of the liquid crystal panel 10.

As shown in FIG. 1, the backlight 20 is an external light source arranged on the rear side (the right side in FIG. 1) of the liquid crystal panel 10. In this embodiment, the backlight 20 includes a plurality of light sources 22 (e.g., a cold cathode tube, light emitting diodes (LEDs), etc.) and a backlight chassis 24. The backlight chassis 24 has a box shape with an opening facing the front side (the liquid crystal panel 10 side). A plurality of light sources 22 are arranged in the backlight chassis 24. A plurality of optical sheets 26 are arranged so as to be stacked together in the opening of the backlight chassis 24.

The optical sheet 26 includes, for example, a diffuser plate, a diffuser sheet, a lens sheet and a luminance enhancing sheet in this order from the rear side. The backlight chassis 24 is attached to the rear side of the frame 32 with the light sources 22 facing the liquid crystal panel 10 described above. Then, the optical sheet 26 is interposed between the rear surface of the frame 32 of the liquid crystal panel 10 and the front surface of the backlight chassis 24. The liquid crystal display device 100 includes a control section 200 as shown in FIG. 1. The control section 200 includes a circuit (e.g., a light modulating circuit such as a cold cathode tube inverter circuit) for adjusting the luminance (brightness) of the backlight 20 according to the image or video to be displayed. The control section 200 adjusts the brightness of the backlight 20 by for example adjusting the power to be input to the light sources 22.

A controlled voltage is applied to the color filter substrate 11 and the array substrate 12 of the liquid crystal panel 10. This operates the liquid crystal molecules in the liquid crystal layer 13 of the liquid crystal panel 10. With the liquid crystal panel 10, the liquid crystal molecules in the liquid crystal layer 13 are operated for each of the pixels A (more specifically the sub-pixels $A_R$, $A_G$ and $A_B$ defined by R, G and B). Thus, light from the backlight 20 can be blocked or transmitted, and the transmittance thereof can also be changed, for each pixel A (more specifically, each of the sub-pixels $A_R$, $A_G$ and $A_B$ defined by R, G and B). Moreover, the liquid crystal display device 100 displays an intended image while controlling the luminance of the backlight 20, etc. Note that each of the sub-pixels $A_R$, $A_G$ and $A_B$ defined by R, G and B is further divided into two subordinate pixels Pa and Pb in this embodiment as shown in FIG. 2.

The driving circuit of the liquid crystal panel 10 will now be described.

As shown in FIG. 5, in the array substrate 12, the bus line 43a is a source bus line (data signal line) for sending a control signal (data signal) to a source electrode 121 of the thin film transistors 47a and 47b. The bus line 43b is a gate bus line (scanning signal line) for sending a control signal (scanning signal) to a gate electrode 122 of the thin film transistors 47a and 47b. The bus line 43c is a bus line (Cs bus line, storage capacitor line) for sending a control signal to the storage capacitors Cs.

In this embodiment, the source bus lines 43a are routed along the column direction of the liquid crystal panel 10 as shown in FIG. 2. The source bus lines 43a are arranged so as to run vertically beside the sub-pixels $A_R$, $A_G$ and $A_B$ defined by R, G and B. In this embodiment, the gate bus lines 43b are routed along the row direction of the liquid crystal panel 10. The gate bus lines 43b are arranged so as to run horizontally in the central portions of the sub-pixels $A_R$, $A_G$ and $A_B$. The Cs bus lines 43c are routed along the row direction of the liquid crystal panel 10. The Cs bus lines 43c are arranged so as to run horizontally through the intervals of the sub-pixels $A_R$, $A_G$ and $A_B$ in the column direction. The source bus lines 43a are connected to the source driver 71. The gate bus lines 43b are connected to the gate driver 72. The Cs bus lines 43c are connected to a group of stem lines 180 (see FIG. 5, FIG. 6) routed on both sides in the row direction of the liquid crystal panel 10.

In this embodiment, in each of the sub-pixels $A_R$, $A_G$ and $A_B$, the thin film transistors 47a and 47b (TFTs) are provided at the intersection between the source bus line 43a and the gate bus line 43b as shown in FIGS. 4 and 5. The thin film transistors 47a and 47b include the source electrode 121, the gate electrode 122 and drain electrodes 123a and 123b. In this embodiment, the source electrode 121 extends from the source bus line 43a to the position where the thin film transistors 47a and 47b are provided. The source electrode 121 is shared by the upper and lower thin film transistors 47a and 47b. The gate electrode 122 is provided in the gate bus line 43b. The drain electrodes 123a and 123b are provided in the areas of the upper and lower subordinate pixels 42a and 42b, respectively. A semiconductor (not shown) is present between the source electrode 121, the gate electrode 122 and the drain electrodes 123a and 123b.

The subordinate pixels Pa and Pb each include the storage capacitor Cs. In the embodiment shown in FIG. 4, the storage capacitor Cs includes the Cs bus line 43c and a storage capacitor electrode 142a or 142b opposing the Cs bus line 43c with an insulating film (not shown) interposed therebetween. In this embodiment, the storage capacitor electrodes 142a and 142b are connected to the drain electrodes 123a and 123b of the thin film transistors 47a and 47b by lead lines 144a and 144b, respectively. The storage capacitor electrodes 142a and 142b are connected to the pixel electrodes 42a and 42b of the subordinate pixels Pa and Pb through contact holes 142a1 and 142b1 running through an interlayer insulating film (not shown).

Figure 6:
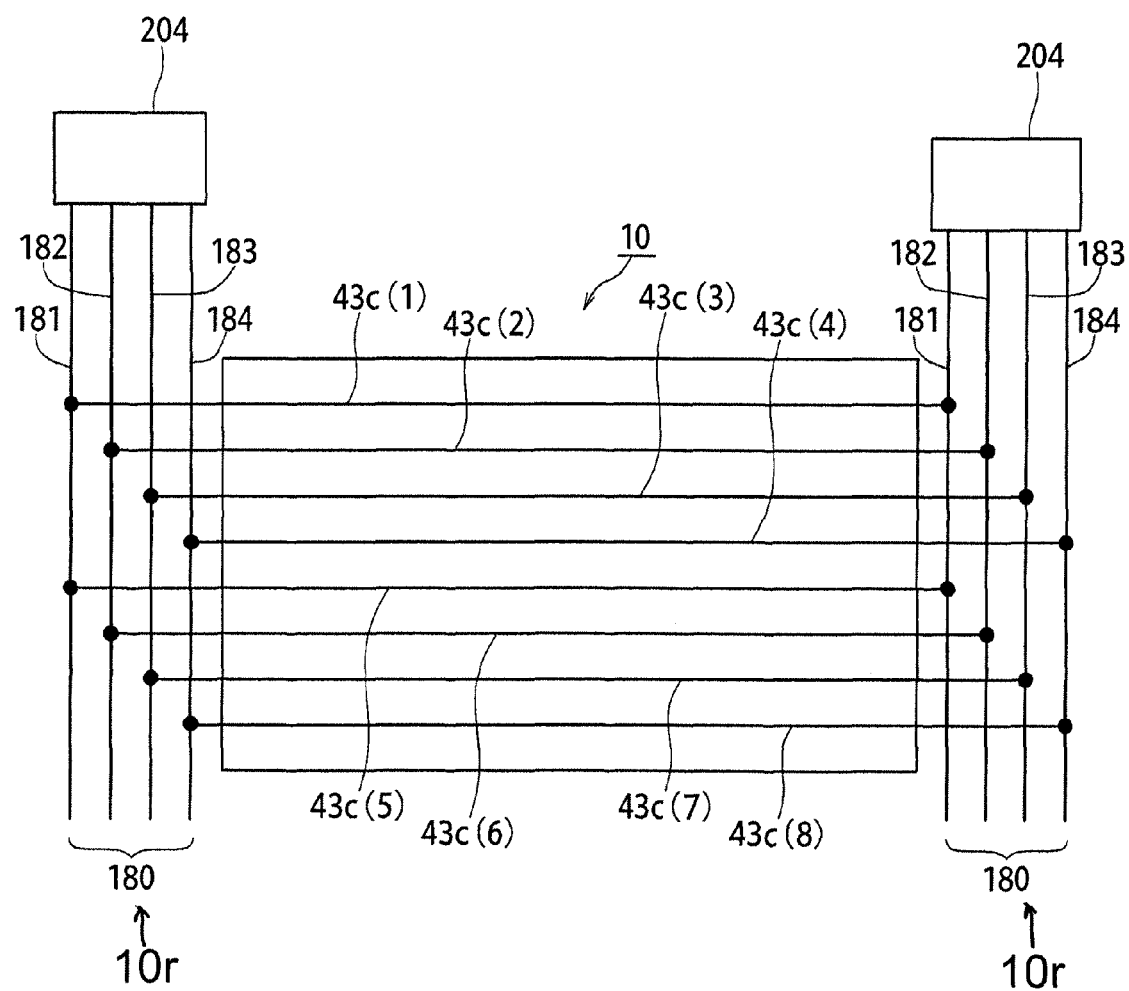
FIG. 6 A diagram showing a wiring structure of storage capacitor lines of a liquid crystal panel.

The Cs bus lines 43c are connected to the group of stem lines 180 along which a plurality of stem lines 181 to 184 are routed. Note that the group of stem lines 180 collectively refers to the plurality of stem lines 181 to 184 which are routed together. The group of stem lines 180 are routed along peripheral portions of the liquid crystal panel 10 (opposite side portions in the row direction of the liquid crystal panel 10 in this embodiment). FIG. 6 is a diagram showing the connection structure of the Cs bus lines 43c and the stem lines 181 to 184.

The Cs bus lines 43c are routed along the row direction of the liquid crystal panel 10 as shown in FIG. 6. The Cs bus lines 43c are arranged with intervals therebetween in the column direction of the liquid crystal panel 10. As shown in FIG. 2, the storage capacitors Cs of the subordinate pixels Pa and Pb, each arranged in the row direction of the liquid crystal panel 10, are connected to the Cs bus lines 43c. In contrast, as shown in FIG. 6, the stem lines 181 to 184 are routed along the column direction of the liquid crystal panel 10 in opposite edge portions 10r extending in the row direction of the liquid crystal panel 10. For example, in the embodiment shown in FIG. 6, four stem lines 181 to 184 are routed in the group of stem lines 180. In this case, ones of the Cs bus lines 43c arranged in the column direction of the liquid crystal panel 10 that are at regular intervals of four lines in the column direction are connected to one stem line.

In the example shown in FIG. 6, eight Cs bus lines 43c(1)-(8) are arranged sequentially in the column direction of the liquid crystal panel 10. In this case, ones of the Cs bus lines 43c that are at regular intervals of four lines in the column direction of the liquid crystal panel 10 are connected to the same one of the stem lines 181 to 184. That is, the Cs bus lines 43c(1) and 43c(5) are connected to the stem line 181. The Cs bus lines 43c(2) and 43c(6) are connected to the stem line 182. The Cs bus lines 43c(3) and 43c(7) are connected to the stem line 183. The Cs bus lines 43c(4) and 43c(8) are connected to the stem line 184. Note that although not shown in the figure, the Cs bus lines 43c connected to the storage capacitors Cs provided in the subordinate pixels Pa and Pb of the liquid crystal panel 10 are preferably connected to different stem lines.

Note that while ones of the Cs bus lines 43c that are at regular intervals of four lines in the column direction of the liquid crystal panel 10 are connected to the same one of the stem lines 181 to 184 in the example shown in FIG. 6, there are actually cases where more stem lines (e.g., 12 stem lines) are provided in the liquid crystal panel 10. Although not shown in the figure, where 12 stem lines are provided, for example, it is preferred that ones of the Cs bus lines 43c that are at regular intervals of 12 lines are connected to the same stem line. Note that it is preferred that the Cs bus lines 43c are connected to predetermined stem lines so that intended control signals are sent to the Cs bus lines 43c. Therefore, in a case where the liquid crystal panel 10 has 12 stem lines, it is not always the case that ones of the Cs bus lines 43c that are at regular intervals of 12 lines are connected to the same stem line.

Figure 7:
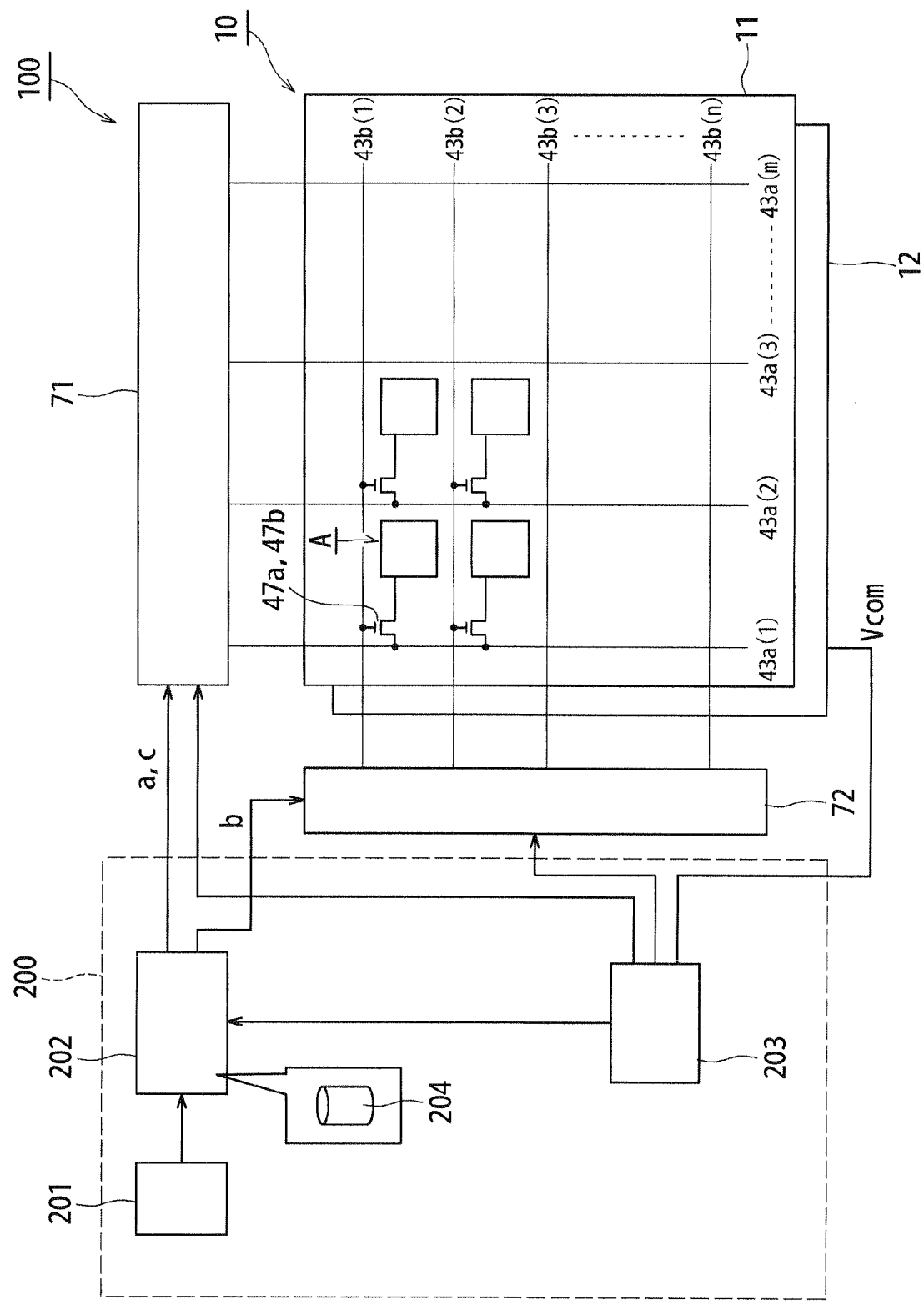
FIG. 7 A control block diagram of a liquid crystal panel.

FIG. 7 is a block diagram showing a driving structure of the liquid crystal panel 10. The liquid crystal display device 100 includes the control section 200 as shown in FIG. 7. The control section 200 is formed by a combination of ICs, LSIs, CPU, non-volatile memories, etc. The control section 200 performs required functions by performing various electronic processes in accordance with a prescribed program. The liquid crystal panel 10 is controlled by the control section 200. The control section 200 includes a signal input section 201, a timing control section 202, a power supply 203, and a storage capacitor control section 204. Note that the control of the storage capacitor Cs (see FIG. 2) is not shown in FIG. 7.

The signal input section 201 receives a plurality of control signals from an external system (not shown). The control signals input from the external system include signals relating to the video to be displayed on the liquid crystal panel 10. In this embodiment, control signals are sent to the source driver 71 and the gate driver 72 through the timing control section 202 based on the control signals input to the signal input section 201. Based on the plurality of control signals input from the external system (not shown), the timing control section 202 generates control signals (the scanning signal a, the data signal b) for operating the gate driver 72 and the source driver 71. The power supply 203 supplies the operation power to various components of the liquid crystal display device 100, and generates a common electrode voltage (Vcom) of the liquid crystal panel 10 and supplies it to the counter electrode 55 (see FIG. 5).

The storage capacitor control section 204 produces the control signals c for controlling the storage capacitors Cs. In this embodiment, the storage capacitor control section 204 produces the control signals c for controlling the storage capacitors Cs based on the control signals a and b produced by the timing control section 202. The control signals a and b for operating the gate driver 72 and the source driver 71 and the control signal c for controlling the storage capacitor Cs are supplied to the liquid crystal panel 10 after their timings are adjusted. Note that in this embodiment, the control signal c for controlling the storage capacitor Cs is sent from the control section 200 to the liquid crystal panel 10 through the source substrate where the source driver 71 is placed, as shown in FIG. 7.

In this embodiment, as shown in FIG. 7, the source bus line 43a(1) to the source bus line 43 a(m), which are routed along the rows of the matrix of the pixels A (accurately, the R, G and B sub-pixels $A_R$, $A_G$ and $A_B$ of the pixels A) of the liquid crystal panel 10, are connected to the source driver 71. In response to the control signal input from the timing control section 202, the source driver 71 selects a reference voltage to be input to the pixels A and supplies the selected reference voltage to the pixels A, thereby controlling the angle of rotation of the liquid crystal molecules.

In response to the control signal input from the timing control section 202, the gate driver 72 turns ON/OFF the thin film transistors 47a and 47b arranged on the liquid crystal panel 10. In this embodiment, the gate driver 72 sends signals to the gate bus lines 43b(1)-(n) on the liquid crystal panel 10. When a control signal for turning ON the thin film transistors 47a and 47b is sent to one gate bus line 43b, the thin film transistors 47a and 47b of pixels that are connected to the gate bus line 43b are turned ON by the control signal. The gate driver 72 sends control signals for turning ON the thin film transistors 47a and 47b sequentially to the gate bus lines 43b(1)-(n).

Control signals whose timings are adjusted are sent from the source driver 71 and the gate driver 72. In this embodiment, in a period of time for which the gate driver 72 turns ON pixels that are connected to one gate bus line 43b, a control signal for controlling the pixels connected to the gate bus line 43b is sent from the source driver 71. The period of time for which the gate driver 72 turns ON all of pixels that are connected to one gate bus line 43b may be called "one horizontal sync period". As the gate driver 72 turns ON pixels that are connected to one gate bus line 43b, the thin film transistors 47a and 47b of the pixels are ON during the one horizontal sync period. In the next horizontal sync period, the pixels connected to the gate bus line 43b are turned OFF.

The source driver 71 sends a control signal to one of the source bus lines 43a(1)-(m) for each horizontal sync period. Thus, at the timing when pixels that are connected to one gate bus line 43b are turned ON, the control signal is sent to the pixels A. Thus, with the liquid crystal panel 10, information is sequentially written to the pixel electrodes 42a and 42b row by row. Then, the gate bus lines 43b(1)-(n) are sequentially turned ON. Thus, one image displayed on the liquid crystal panel 10 is formed. Therefore, by dividing a video into a plurality of chronologically-arranged still images and chronologically forming the still images one by one on the liquid crystal panel 10, a video can be displayed. Note that the period of time for which one image is formed on the liquid crystal panel 10, i.e., the period of time for which the gate bus lines 43b(1)-(n) are sequentially turned ON, may be called a "frame period (frame time)".

In this embodiment, as shown in FIGS. 2 and 4, one pixel A is formed by the sub-pixels $A_R$, $A_G$ and $A_B$ defined by R, G and B. Moreover, the sub-pixels $A_R$, $A_G$ and $A_B$ are each divided into two subordinate pixels Pa and Pb.

Condensers (Clc) for storing charge are formed between the pixel electrodes 42a and 42b of the subordinate pixels Pa and Pb and the counter electrode 55 on the color filter substrate 11 side opposing the pixel electrodes 42a and 42b with the liquid crystal layer 13 interposed therebetween as shown in FIGS. 4 and 5. The storage capacitors Cs are formed between the Cs bus lines 43c and the storage capacitor electrodes 142a and 142b. The pixel electrodes 42a and 42b are connected to the source bus line 43a through the thin film transistors 47a and 47b. The Cs bus lines 43c are connected to the stem lines 181 to 184 provided in opposite edge portions 10r extending in the row direction of the liquid crystal panel 10. The control signal c for controlling the storage capacitor Cs is supplied to the stem lines 181 to 184 from the storage capacitor control section 204.

As described above, the thin film transistors 47a and 47b are opened at an appropriate timing based on the scanning signal from the gate bus line 43b. At this timing, the data signal input to the source bus line 43a is written to the pixel electrodes 42a and 42b. In other words, charge is stored in the pixel electrodes 42a and 42b based on the data signal input to the source bus line 43a.

Figure 8:
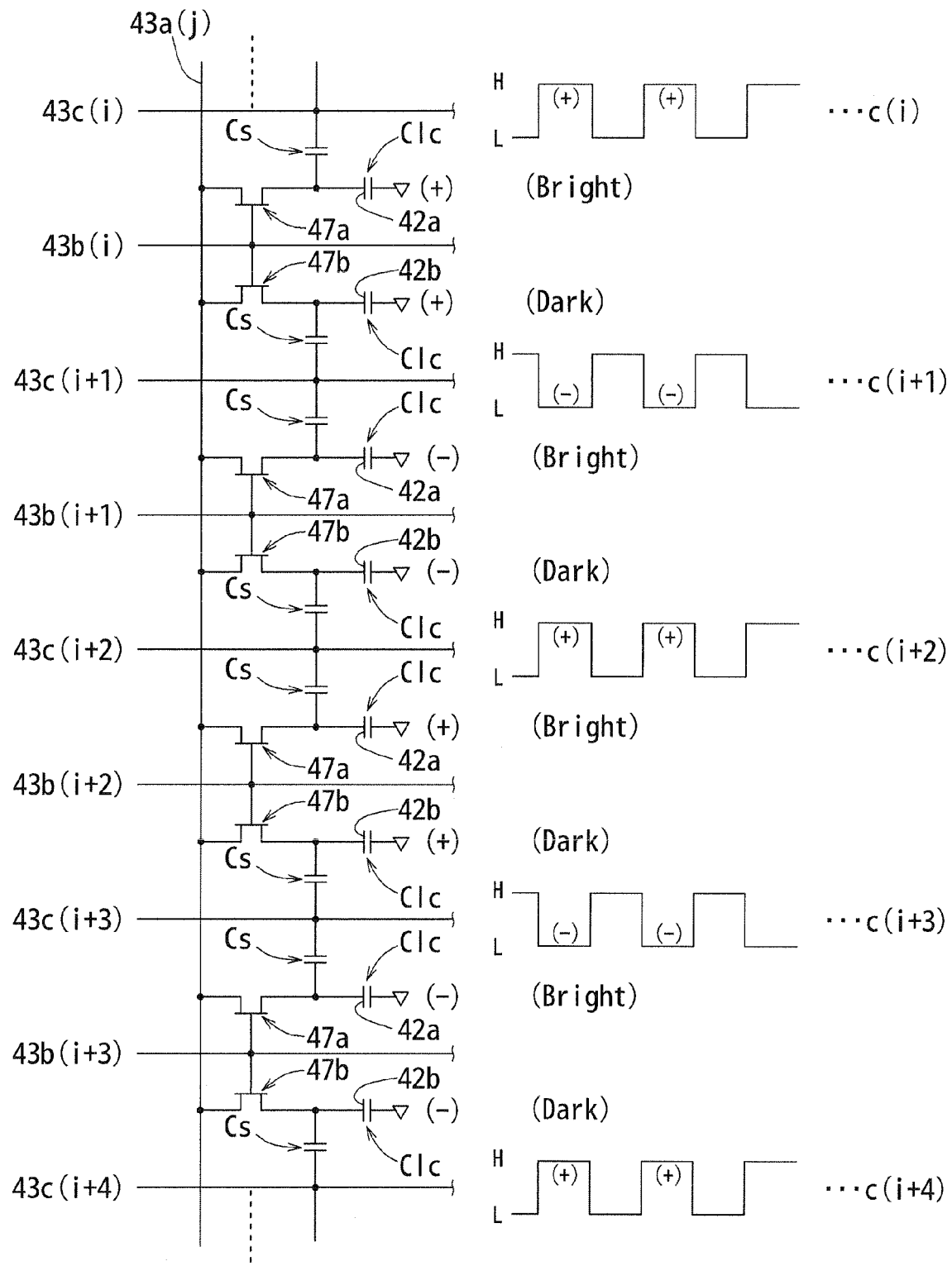
FIG. 8 A diagram showing a circuit configuration of a sub-pixel of a liquid crystal panel.

In this embodiment, the liquid crystal panel 10 is controlled by so-called "dot inversion driving". In this case, the polarity of the data signal input to the source bus line 43a is inverted for every dot (for every sub-pixel in this embodiment). For example, as shown in FIG. 8, when a data signal having a (+) charge is input for a sub-pixel of the $i^{th}$ column, a data signal having a (−) charge is input for a sub-pixel of the $(i+1)^{th}$ column. A data signal having a (+) charge is input to a sub-pixel of the $(i+2)^{th}$ column. Moreover, a data signal having a (−) charge is input to a sub-pixel of the $(i+3)^{th}$ column. Thus, for the same frame period, the polarity of the input data signal is inverted for every column. Although not shown in the figures, in this embodiment, the polarities of data signals input to sub-pixels adjacent to each other in the row direction are also inverted. The polarity of the data signal input to the same sub-pixel is inverted for every frame period.

In this embodiment, a control signal made of a rectangular wave is sent to the Cs bus line 43c after the thin film transistors 47a and 47b are turned OFF. Then, by the influence of the voltages applied to the storage capacitors Cs, charges stored in the pixel electrodes 42a and 42b of the subordinate pixels Pa and Pb are maintained. Note that in this embodiment, as shown in FIG. 5, a pair of control signals whose signal voltage changes are of opposite directions and of an equal amount are sent to the storage capacitors Cs of the subordinate pixels Pa and Pb within the same sub-pixel. In this case, one of the subordinate pixels Pa and Pb is brighter and the other darker.

That is, a pair of control signals c(i) and c(i+1) are sent to the storage capacitors Cs of the subordinate pixels Pa and Pb within the sub-pixel. The pair of control signals c(i) and c(i+1) are control signals whose signal voltage changes are of opposite directions and of an equal amount. In the example shown in FIG. 8, a rectangular wave whose voltage level changes with a predetermined period is supplied as the control signal c. Here, "H" denotes the high voltage level (high level) of the rectangular wave and "L" denotes the low voltage level (low level) of the rectangular wave. The data signal a is sent to the source bus line 43a(j). The scanning signal b is sent to the gate bus line 43b(i). The control signals c(i) and c(i+1) are sent to the Cs bus lines 43c(i) and 43c(i+1). The timings of the data signal a, the scanning signal b and the Cs bus lines 43c(i) and 43c(i+1) are adjusted.

Figure 9:
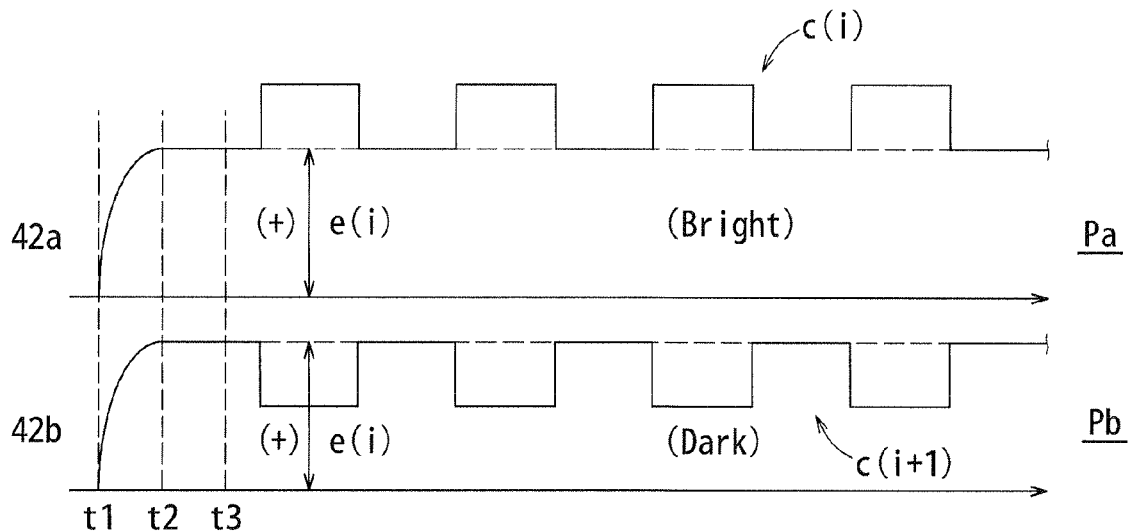
FIG. 9 A diagram showing a change in a charge of a pixel electrode.

Sub-pixels to which a data signal having a (+) charge is input from the source bus line 43a will now be described. For example, in FIG. 8, they are the sub-pixels of the $i^{th}$ column and the $(i+2)^{th}$ column. FIG. 9 shows the transitions of the voltages applied to the pixel electrodes 42a and 42b for the frame period in which a data signal having a (+) charge is input from the source bus line 43a for a sub-pixel of the $i^{th}$ column shown in FIG. 8.

In this case, as shown in FIG. 9, in the sub-pixel, in the period t1-t2 in which the thin film transistor 47 is turned ON, a (+) charge e(i) is stored in the pixel electrodes 42a and 42b based on the data signal. Then, after the timing t3 at which the thin film transistor 47 is turned OFF, the charges stored in the pixel electrodes 42a and 42b transition by the influence of the storage capacitors Cs.

Then, in one subordinate pixel Pa in the sub-pixel, the control signal c(i) is sent from the Cs bus line 43c(i) to the storage capacitor Cs. The voltage level of the control signal c(i) changes to "H" after the timing t3 at which the thin film transistor 47a is turned OFF. Therefore, in the subordinate pixel Pa, the (+) charge e(i) stored in the pixel electrode 42a transitions to positive (+). Thus, the subordinate pixel Pa becomes brighter.

In contrast, in the other subordinate pixel Pb in the sub-pixel, the control signal c(i+1) is sent to the storage capacitor Cs from the Cs bus line 43c(i+1). The voltage level of the control signal c(i+1) changes to "L" after the timing t3 at which the thin film transistor 47b is turned OFF. Thus, in the subordinate pixel Pb, the (+) charge e(i) stored in the pixel electrode 42b transitions to negative (−). Thus, the subordinate pixel Pb becomes darker.

Figure 10:
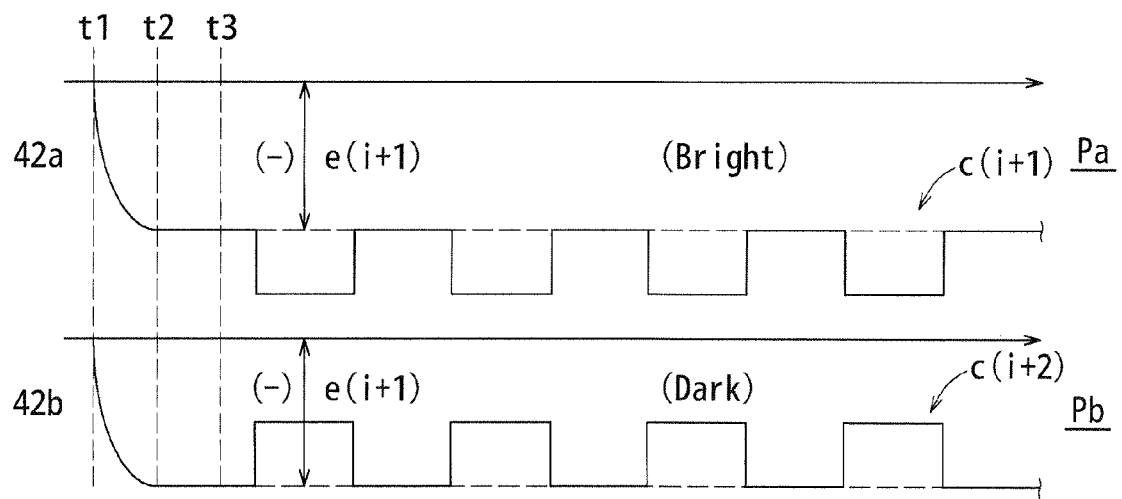
FIG. 10 A diagram showing a change in a charge of a pixel electrode.

Next, sub-pixels to which a data signal having a (−) charge is input from the source bus line 43a will be described. For example, in FIG. 8, they are the sub-pixels of the $(i+1)^{th}$ column and the $(i+3)^{th}$ column. FIG. 10 shows the transitions of voltages applied to the pixel electrodes 42a and 42b for the frame period in which a data signal having a (−) charge is input from the source bus line 43a for a sub-pixel of the $(i+1)^{th}$ column shown in FIG. 8.

In this case, as shown in FIG. 10, in the sub-pixel, in the period t1-t2 in which the thin film transistor 47 is turned ON, a (−) charge e(i+1) is stored in the pixel electrodes 42a and 42b based on the data signal. Then, after the timing t3 at which the thin film transistor 47 is turned OFF, the charges stored in the pixel electrodes 42a and 42b transition by the influence of the storage capacitors Cs.

Then, in one subordinate pixel Pa in the sub-pixel, the control signal c(i+1) is sent from the Cs bus line 43c(i+1) to the storage capacitor Cs. The voltage level of the control signal c(i+1) changes to "L" after the timing t3 at which the thin film transistor 47a is turned OFF. Thus, in the subordinate pixel Pa, the (−) charge e(i+1) stored in the pixel electrode 42a transitions to negative (−). Thus, the subordinate pixel Pa becomes brighter.

In contrast, in the other subordinate pixel Pb in the sub-pixel, the control signal c(i+2) is sent to the storage capacitor Cs from the Cs bus line 43c(i+2). The voltage level of the control signal c(i+2) changes to "H" after the timing t3 at which the thin film transistor 47b is turned OFF. Thus, in the subordinate pixel Pb, the (−) charge e(i+1) stored in the pixel electrode 42b transitions to positive (+). Thus, the subordinate pixel Pb becomes darker.

As described above, in this embodiment, the sub-pixels $A_R$, $A_G$ and $A_B$ each include subordinate pixels Pa and Pb whose brightness levels are different from each other. The subordinate pixels Pa and Pb each include a storage capacitor Cs. The storage capacitors Cs of the subordinate pixels Pa and Pb are connected to different Cs bus lines 43c (storage capacitor lines). A pair of control signals c are sent to the storage capacitors Cs provided in the subordinate pixels Pa and Pb whose brightness levels are different from each other. The pair of control signals c sent here are control signals sent through different Cs bus lines 43c, and are signals whose signal voltage changes are of opposite directions and of an equal amount. Thus, brightness levels of the subordinate pixels Pa and Pb are controlled.

The Cs bus lines 43c are each provided along the row direction of the liquid crystal panel 10. A plurality of Cs bus lines 43c are provided in the column direction of the liquid crystal panel 10. Moreover, the storage capacitors Cs of a series of subordinate pixels Pa and Pb provided in the row direction are connected to the Cs bus line 43c. For example, ones of the Cs bus lines 43c that are at regular intervals of several lines in the column direction of the liquid crystal panel 10 are connected to the same one of the stem lines 181 to 184 (see FIG. 6). The same control signal c is sent to Cs bus lines 43c that are connected to the same one of the stem lines 181 to 184. Note that in order to simplify the figure, FIG. 6 illustrates an embodiment where there are four stem lines 181 to 184 and ones that are at regular intervals of four lines are connected to the same stem line. The liquid crystal panel 10 is not limited to the embodiment. In a case where a pair of control signals whose signal voltage changes are of opposite directions and of an equal amount are sent, an even number of stem lines are provided in pairs of two.

Thus, with so-called "multi-pixel driving", for data signals, controls signals whose polarities are inverted from each other are sent to ones of the pixels A arranged in a matrix pattern that are adjacent to each other in the column direction. Moreover, a pair of control signals c(k) and c(k+1) whose signal voltage changes are of opposite directions and of an equal amount are sent to the storage capacitors Cs provided in the first subordinate pixel Pa and the second subordinate pixel Pb. The two Cs bus lines 43c through which the pair of control signals whose signal voltage changes are of opposite directions and of an equal amount are sent are synchronized together as a pair, and the phases of control signals of other pairs are slightly shifted therefrom. For example, where six pairs of control signals having the same waveform and inverted polarities are supplied through 12 stem lines, the phases of the pairs are preferably shifted by 30 degrees so that the six pairs of control signals are evenly shifted from one another.

With the so-called "multi-pixel driving structure" described above, one sub-pixel includes two subordinate pixels. For example, where there is a pixel defect in one subordinate pixel but there is no pixel defect in the other subordinate pixel, it is possible to prevent the sub-pixel from not functioning at all. Therefore, the proportion of normal pixels is maintained to be high. In this embodiment, the brightnesses of the subordinate pixels Pa and Pb are different from each other. In other words, one (e.g., the upper subordinate pixel Pa) forms a brighter pixel, and the other (e.g., the lower subordinate pixel Pb) forms a darker pixel. In such a case, the luminance of each of the R, G and B sub-pixels $A_R$, $A_G$ and $A_B$ can be adjusted more finely, enriching representation such as half-tone colors. Other functions of the multi-pixel driving are also described in Patent Document 1.

With the liquid crystal display device 100 of the multi-pixel driving, rectangular waves are used as control signals for controlling storage capacitors as described above. A phenomenon called "waveform rounding" occurs in the rectangular waves. The "waveform rounding" refers to the phenomenon in which the waveform is distorted. The "waveform rounding" phenomenon will now be described.

For example, in the embodiment described above, rectangular waves are input. It is preferred that the same waveform of the rectangular wave is maintained for any sub-pixel in the liquid crystal panel 10. It is believed that the "waveform rounding" occurs due to for example the influence of the resistance of the wires for sending the control signals c of the storage capacitors Cs.

Figure 11:
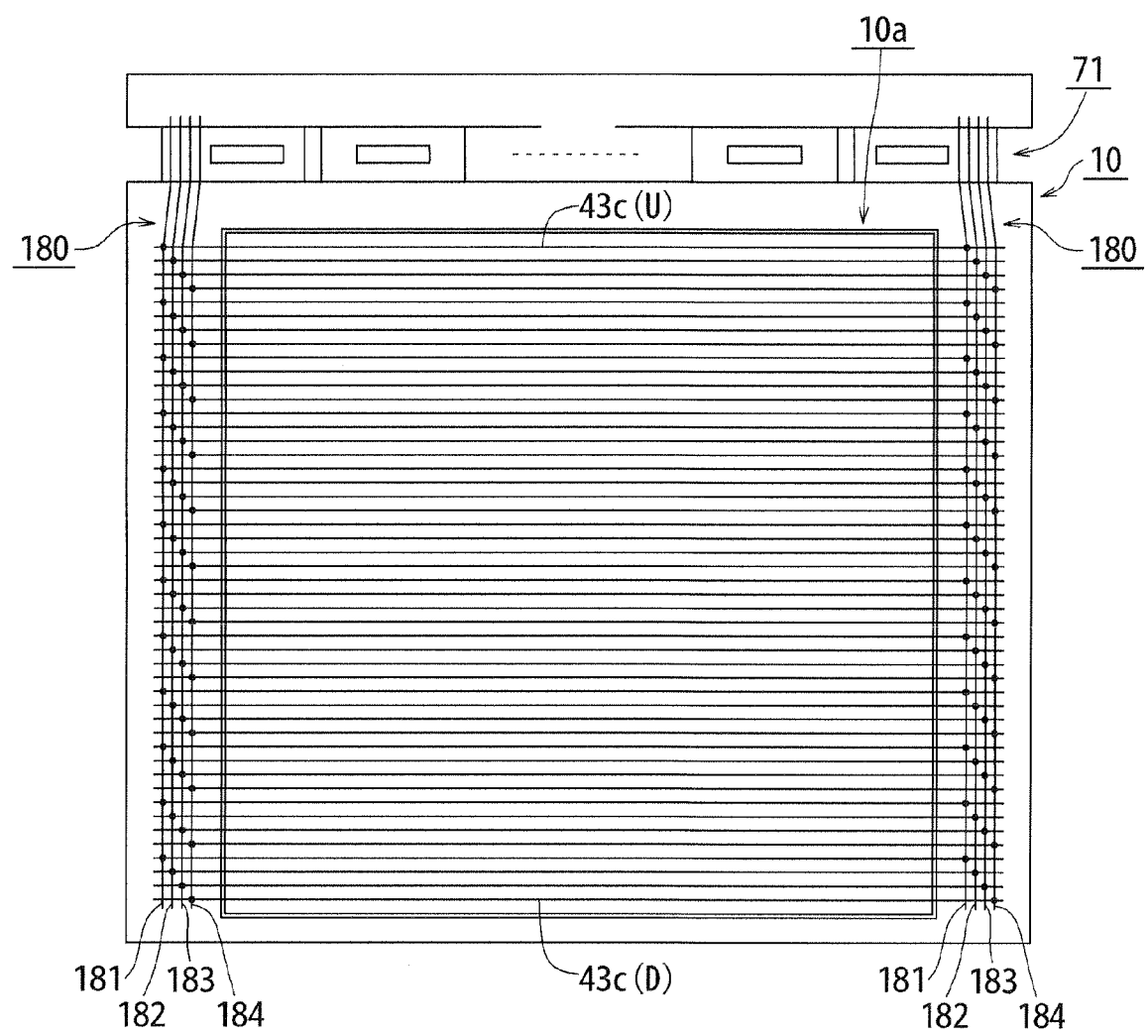
FIG. 11 A diagram showing a circuit configuration of a liquid crystal panel according to an embodiment of the present invention.

That is, as shown in FIG. 5, the storage capacitors Cs are connected to the Cs bus lines 43c (storage capacitor lines) routed along the row direction of the liquid crystal panel 10. The Cs bus lines 43c are connected to the stem lines 181 to 184 routed in opposite edge portions 10r extending in the row direction of the liquid crystal panel 10 as shown in FIG. 11, for example. Ones of the Cs bus lines 43c that are at regular intervals of several lines in the column direction of the liquid crystal panel 10 are connected to the same one of the stem lines 181 to 184, and the same one of the control signals c(1)-c(4) is sent to ones that are at regular intervals of several lines. Note that the number of the stem lines 181 to 184 and the number of the Cs bus lines 43c are simplified in FIG. 11 for the purpose of illustration. For example, while a case where there are four stem lines is illustrated, the number of stem lines is not limited to four.

The stem lines 181 to 184 are connected to the storage capacitor control section 204 for sending the control signals of the storage capacitors Cs. In this case, the control signals c are sent to the storage capacitors Cs in the liquid crystal panel 10 from the storage capacitor control section 204 through the stem lines 181 to 184 and the Cs bus lines 43c. In this embodiment, as shown in FIG. 7, the control signals c are sent to the stem lines 181 to 184 from the control section 200 through the substrate of the source driver 71. Therefore, the control signals c are sent to the stem lines 181 to 184 from the upper side of the liquid crystal panel 10 (the side on which the source driver 71 is provided).

In this case, for example, it is believed that among the Cs bus lines 43c in the liquid crystal panel 10, a Cs bus line 43c (D) placed in a lower portion has a longer wiring path to the storage capacitor Cs and a higher resistance than a Cs bus line 43c (U) placed in an upper portion. Therefore, waveform rounding is more likely to occur on the Cs bus line 43c (D) placed in a lower potion of the liquid crystal panel 10 than on the Cs bus line 43c (U) placed in an upper portion.

Figure 12:
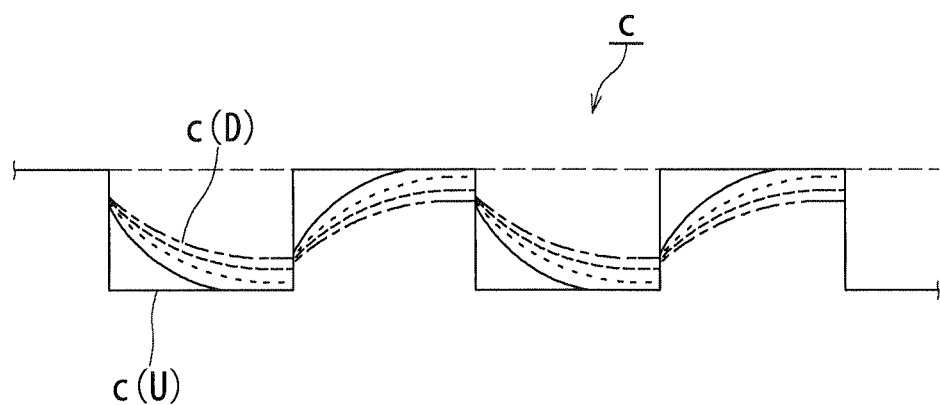
FIG. 12 A diagram showing waveform rounding occurring in a control signal.

FIG. 12 schematically shows the "waveform rounding". That is, FIG. 12 shows the waveform of a rectangular wave input as a control signal c for controlling a storage capacitor Cs. As described above, waveform rounding is more likely to occur on the Cs bus line 43c (D) placed in a lower portion of the liquid crystal panel 10 than on the Cs bus line 43c (U) placed in an upper portion. When there is waveform rounding, the rising edge of the rectangular wave is blunted as shown in FIG. 12, for example. In FIG. 12, a waveform c (U) represents the waveform of a control signal c supplied to the Cs bus line 43c (U) in an upper portion of the liquid crystal panel 10. A waveform c (D) represents the waveform of a control signal c supplied to the Cs bus line 43c (D) in a lower portion of the liquid crystal panel 10. The waveforms shown between the waveform c (U) and the waveform c (D) represent the waveforms of control signals c supplied to Cs bus lines 43c in a middle portion of the liquid crystal panel 10. Thus, the waveform of the control signal c supplied to the Cs bus line 43c tends to be more deformed gradually from the upper portion toward the lower portion of the liquid crystal panel 10.

In the so-called "full high definition (Full HD)" standard, there are 1920 pixels formed in the horizontal direction and 1080 pixels are formed in the vertical direction. In this case, with such a multi-pixel driving structure as described above, the sub-pixels $A_R$, $A_G$ and $A_B$ defined by R, G and B are formed in one pixel A, and each of the sub-pixels $A_R$, $A_G$ and $A_B$ is further divided into two subordinate pixels Pa and Pb. Therefore, 1920×3 subordinate pixels are formed in the horizontal direction, and 1080×2 subordinate pixels are formed in the vertical direction. Thus, as the number of pixels in the vertical direction increases, the difference in waveform rounding between the upper portion and the lower portion of the liquid crystal panel 10 is likely to increase accordingly. As the number of pixels in the horizontal direction increases, the number of storage capacitors Cs connected to a Cs bus line 43c increases accordingly, thereby increasing the resistance of the Cs bus line 43c. It is believed that if the resistance of the Cs bus line 43c is high, the waveform rounding is more likely to occur accordingly, and the difference in waveform between the upper portion and the lower portion of the liquid crystal panel 10 is likely to increase.

If the waveform of the control signal supplied to the Cs bus line 43c of the liquid crystal panel 10 varies from one Cs bus line 43c to another as shown in FIG. 12 due to waveform rounding, the effect of multi-pixel driving may lower. If there is a Cs bus line 43c on which the waveform of the control signal is significantly deformed by the waveform rounding, streak-like non-uniformity (streaks) may occur in the row direction of the liquid crystal panel 10.

One method of reducing the waveform rounding is for example to reduce the resistance of the stem lines 181 to 184 by thickening the stem lines 181 to 184 (see FIG. 11) routed in opposite edge portions 10r in the row direction of the liquid crystal panel 10. However, if each of the stem lines 181 to 184 is thickened, accordingly more space is needed in the opposing edge portions of the liquid crystal panel 10. For example, consider a case where 12 stem lines are routed on both sides of the liquid crystal panel 10 in the liquid crystal panel 10 for a large TV set such as a 65-inch. In this case, it is believed that a width of about 1 cm is required in opposite edge portions of the liquid crystal panel 10 as space for routing stem lines in order to obtain a sufficient effect such that streak-like non-uniformity does not occur. Providing such space on both sides of the liquid crystal panel 10 contradicts the demand for thinning the bezel.

In order to improve the problem, the present inventors conducted various researches and discovered a novel method for reducing waveform rounding. That is, in the present invention, as shown in FIG. 13, there are a plurality of branch lines 310 routed in the column direction across the pixel region 10a. The branch lines 310 are connected to the Cs bus lines 43c. The control signals c of the storage capacitors Cs are produced in the control section 200 (specifically, the storage capacitor control section 204 (see FIG. 7)). In this embodiment, the control signals c are sent to the branch lines 310 from the control section 200 (see FIG. 7) through the substrate of the source driver 71. Wiring paths are formed along which the control signals c are sent from the branch lines 310 to the storage capacitors Cs through the Cs bus lines 43c.

In this case, a plurality of branch lines 310 can be provided in the pixel region 10a. By providing a plurality of branch lines 310, it is possible to form a plurality of wiring paths along which the control signals c are sent from the branch lines 310 to the storage capacitors Cs through the Cs bus lines 43c. In this case, since there are a plurality of wiring paths, the resistance of the wiring path along which the control signal c is sent to the storage capacitor Cs can be suppressed to be small. In this case, the more the number of branch lines 310 provided in the pixel region 10a is increased, the more the resistance acting upon each branch line 310 can be reduced, thereby generally reducing the resistance of the wiring paths along which the control signals c are sent to the storage capacitors Cs. Therefore, if the number of branch lines 310 is increased, the problem of the "waveform rounding" can be improved even if each branch line 310 is thinned.

Where a plurality of branch lines 310 described above are provided in the pixel region 10a as shown in FIG. 13, wiring paths are formed along which the control signals c are sent from the branch lines 310 to the storage capacitors Cs through the Cs bus lines 43c. Therefore, it is possible to suppress the problem of the "waveform rounding" even if the stem lines 181 to 184 are thinned. Since the control signals c can be sent from the branch lines 310 to the storage capacitors Cs through the Cs bus lines 43c, it is possible to suppress the problem of the "waveform rounding" even if the stem lines 181 to 184 which are routed in opposite edge portions 10r in the row direction of the liquid crystal panel 10 are eliminated. The stem lines 181 to 184 may be routed only in one edge portion 10r in the row direction of the liquid crystal panel 10.

Figure 14:
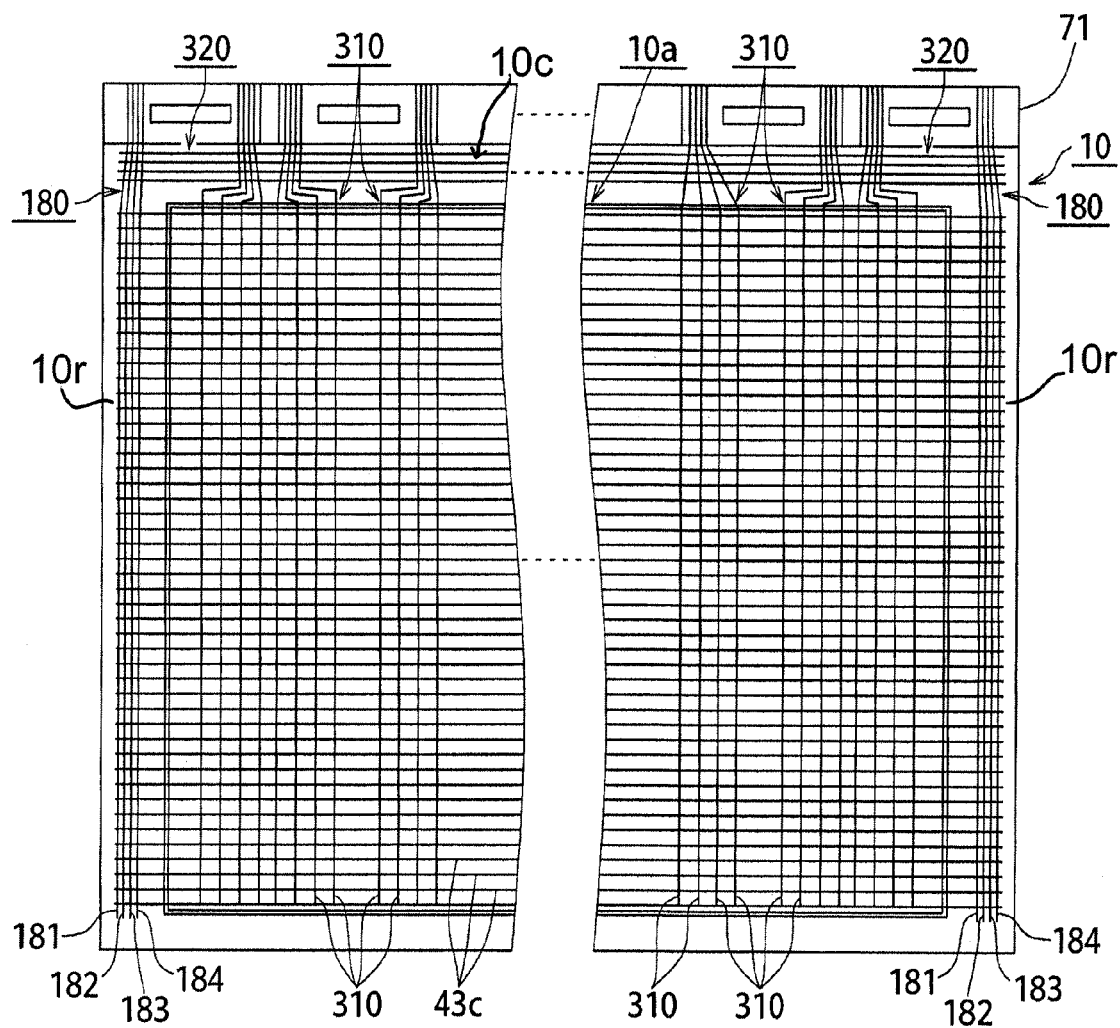
FIG. 14 A diagram showing a circuit configuration of a liquid crystal panel according to an embodiment of the present invention.

In this case, as shown in FIG. 14, a plurality of horizontal stem lines 320 may be provided routed in an edge portion 10c in the column direction of the liquid crystal panel 10. In this embodiment, the horizontal stem lines 320 are routed along the row direction in an upper edge portion 10c (an edge portion in the column direction) of the liquid crystal panel 10, and the branch lines 310 are connected to the horizontal stem lines 320. With the horizontal stem lines 320, the branch lines 310 are electrically connected, and the wiring paths of control signals to the storage capacitors Cs are made more uniform, thereby reducing the difference between waveforms due to waveform rounding. Thus, it is possible to suppress the problem of the "waveform rounding". In this case, although space is needed for routing a plurality of horizontal stem lines 320 in an edge portion 10c in the column direction of the liquid crystal panel 10, the horizontal stem lines 320 are wires for connecting the branch lines 310 and do not need to be thick and space for routing the plurality of horizontal stem lines 320 does not require a large width. For example, where 12 horizontal stem lines 320 are routed in the liquid crystal panel 10 for a large TV set such as a 65-inch full high definition standard, necessary horizontal stem lines 320 can be routed if there is a width of about 1 to 3 mm in an edge portion 10c in the column direction of the liquid crystal panel 10.

Next, the connection between the branch lines 310 and the Cs bus lines 43c will be described. For example, as shown in FIG. 6, a plurality of Cs bus lines 43c are provided in the column direction of the liquid crystal panel 10. The control signal of the same storage capacitor Cs is sent to ones of the Cs bus lines 43c that are at regular intervals of several lines. That is, in the example shown in FIG. 6, four stem lines 181 to 184 are routed in opposite edge portions 10r in the row direction of the liquid crystal panel 10. Ones of the Cs bus lines 43c routed in the column direction that are at regular intervals of four lines are connected to the same stem line. Thus, the same control signal is supplied to ones of the Cs bus lines 43c routed in the column direction that are at regular intervals of four lines.

Figure 15:
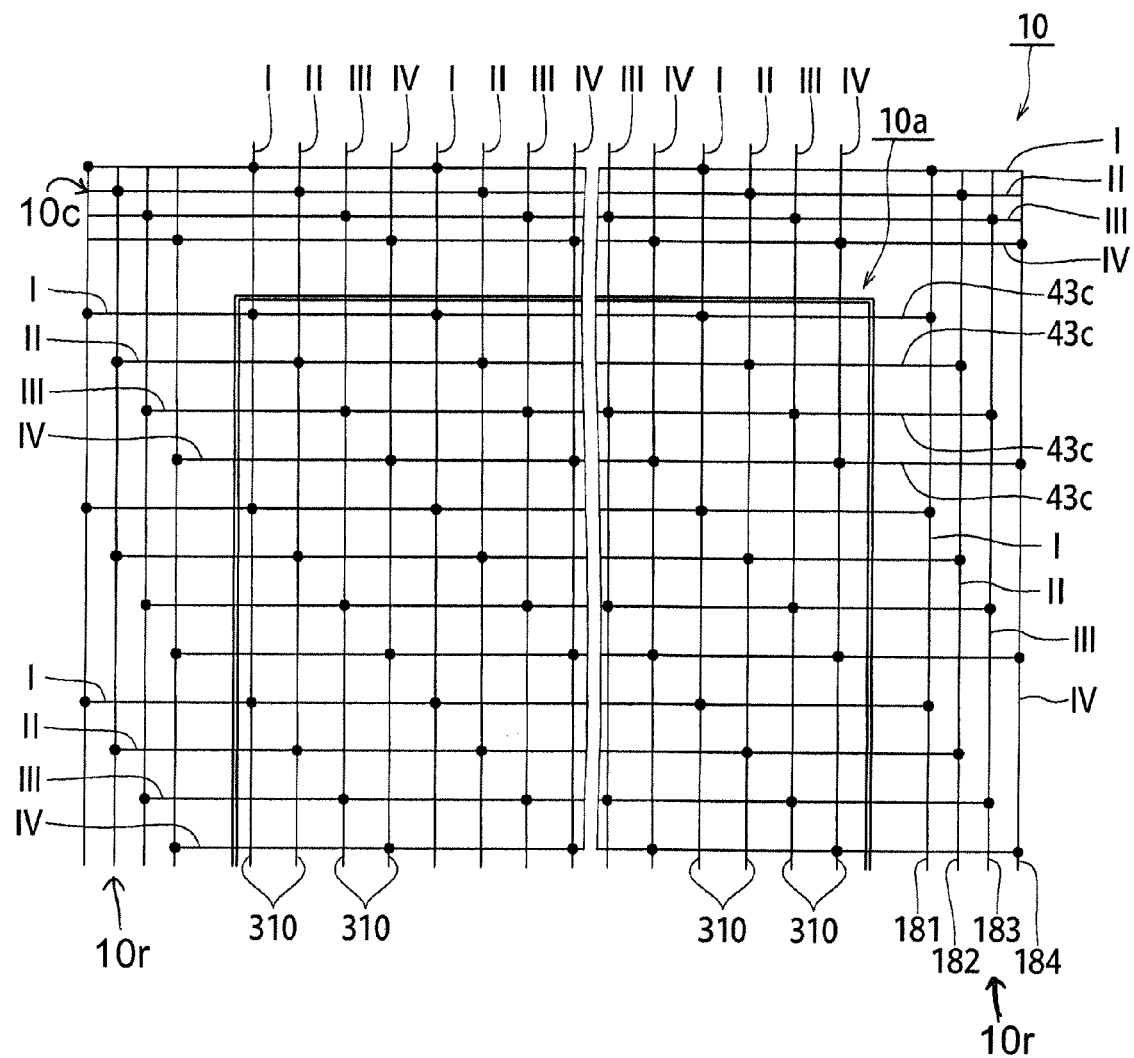
FIG. 15 A diagram showing a circuit configuration of a liquid crystal panel according to an embodiment of the present invention.

Thus, there are cases where ones of the Cs bus lines 43c that are at regular intervals of several lines receive the same control signal. In this case, the plurality of branch lines 310 routed across the pixel region 10a are preferably grouped into a plurality of groups. Then, they are preferably connected to the storage capacitor control section 204 so that the same control signal is sent to branch lines belonging to the same group. Moreover, one Cs bus line 43c is preferably connected to branch lines 310 belonging to one group. Thus, it is possible to supply one control signal to one Cs bus line 43c.

Where the same control signal is supplied to ones of the Cs bus lines 43c that are at regular intervals of four lines, the plurality of branch lines 310 routed across the pixel region 10a are preferably grouped into four groups I-IV as shown in FIG. 15. Then, the branch lines 310 are preferably connected to the storage capacitor control section 204 (see FIG. 14) so that the same control signal is sent to the branch lines 310 belonging to the same group. Ones of the Cs bus lines 43c that are at regular intervals of four lines are preferably connected to the branch lines 310 belonging to the same group. Thus, the same control signal is supplied to the Cs bus line 43c from a plurality of branch lines 310 belonging to the same group. Then, it is possible to give the same control signal to the storage capacitors Cs connected to the Cs bus line 43c.

Where the liquid crystal panel 10 includes a plurality of stem lines 181 to 184 in edge portions 10r in the row direction as shown in FIGS. 14 and 15, a Cs bus line 43c is preferably connected to one of the plurality of stem lines 181 to 184. Then, the same control signal as that sent to the branch lines 310 belonging to one group to which the Cs bus line 43c is connected is preferably sent to the one stem line by the storage capacitor control section 204 (see FIG. 14).

Figure 16:
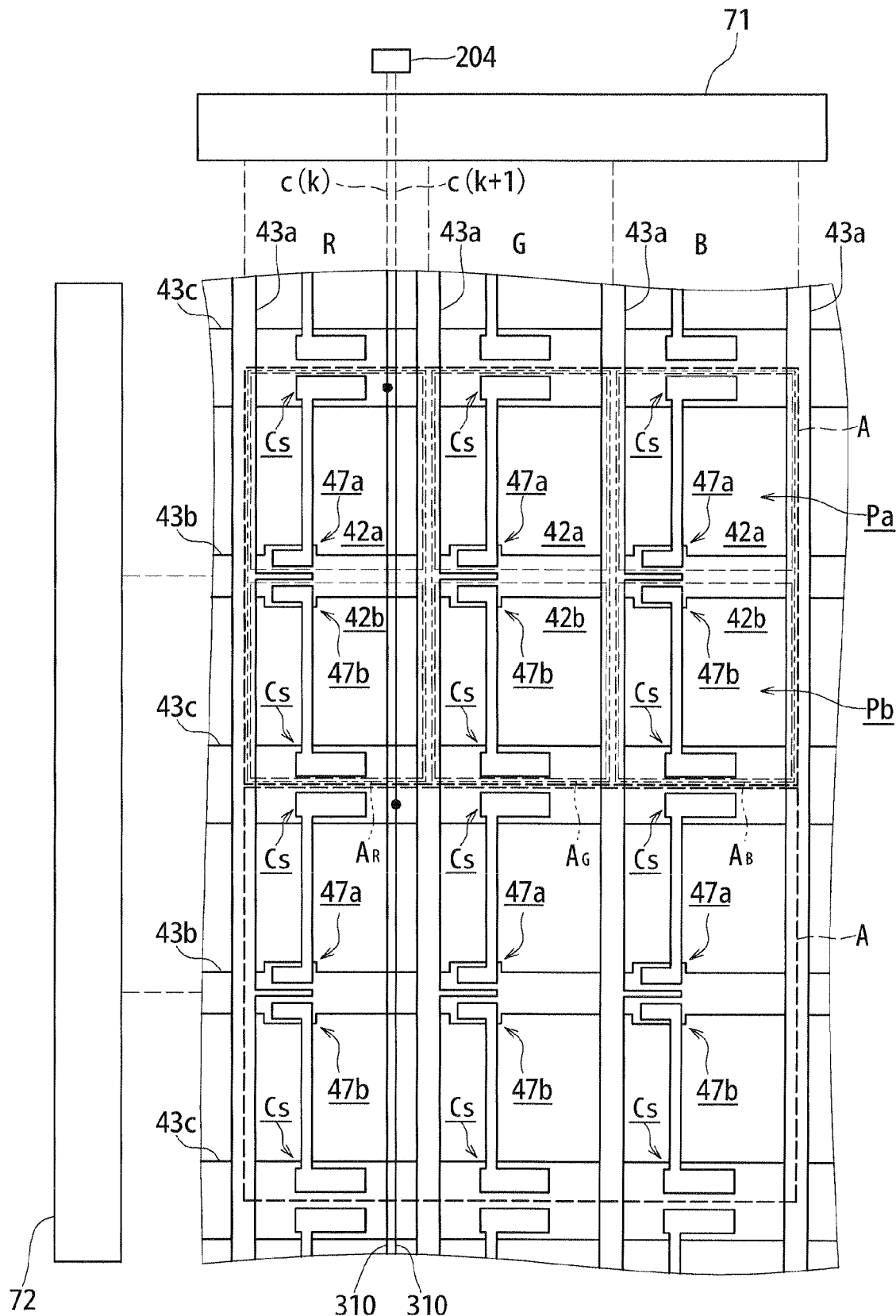
FIG. 16 A plan view showing a circuit configuration of a liquid crystal panel according to an embodiment of the present invention.
Figure 17:
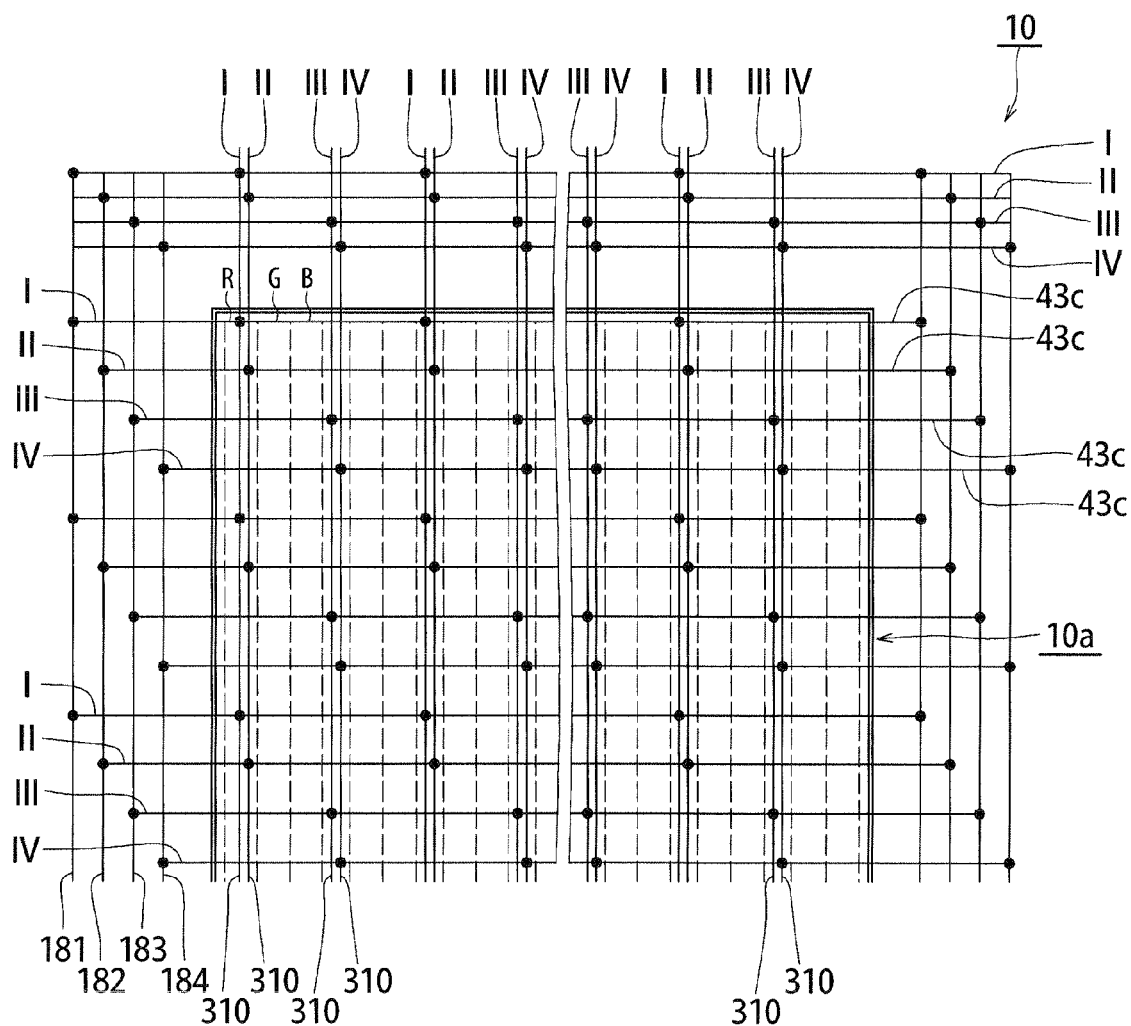
FIG. 17 A diagram showing a circuit configuration of a liquid crystal panel according to an embodiment of the present invention.

In this embodiment, as shown in FIGS. 14 and 15, the liquid crystal panel 10 includes a plurality of horizontal stem lines 320 routed in an edge portion 10c in the column direction (an upper edge portion in the illustrated example). Branch lines 310 belonging to one group are connected to one horizontal stem line 320 that is different from horizontal stem lines 320 connected with branch lines 310 of the other groups. In this case, since the branch lines 310 belonging to one group to which the same control signal is sent by the storage capacitor control section 204 are electrically connected through the horizontal stem lines 320, it is possible to reduce the waveform rounding on the branch lines 310.

Where the branch lines 310 are routed across the pixel region 10a, the branch lines 310 may be routed through the pixels A of the liquid crystal panel 10 as shown in FIGS. 16 and 17. In this case, it is preferred that the branch lines 310 are routed evenly for different pixels A. Thus, the pixels A can be configured evenly, and it is possible to prevent display non-uniformity from one pixel A to another.

For example, where each pixel A of the liquid crystal panel 10 includes R, G and B sub-pixels as shown in FIGS. 16 and 17, the branch lines 310 are routed so as to pass through the R sub-pixels $A_R$ of the R, G and B sub-pixels. Thus, where the branch lines 310 are routed through the R sub-pixels $A_R$, it is preferred that the branch lines 310 are routed so as to evenly pass through the R sub-pixels $A_R$ for all the pixels A of the liquid crystal panel 10. Thus, the pixels A can be configured evenly, and it is possible to prevent display non-uniformity from one pixel A to another.

Although not shown in the figures, the branch lines 310 may be routed so as to pass through the G sub-pixels $A_G$. The branch lines 310 may be routed so as to pass through the B sub-pixels $A_B$. Also in this case, by evenly configuring the pixels A, it is possible to prevent display non-uniformity from one pixel A to another. For example, the branch lines 310 may be provided through all of the sub-pixels $A_R$, $A_G$ and $A_B$ of the R, G and B sub-pixels. The branch lines 310 may be provided through sub-pixels of two colors selected from the R, G and B sub-pixels $A_R$, $A_G$ and $A_B$.

One of the sub-pixels $A_R$, $A_G$ and $A_B$ through which the branch line 310 is routed is preferably selected taking into consideration the characteristics, etc., of the pixels A for the liquid crystal panel 10. For example, a sub-pixel that has a small influence on the transmittance of the pixel as a whole may be selected in order to prevent a decrease in the transmittance of the pixel A as a whole. For example, where the sub-pixel $A_G$ of the sub-pixels $A_R$, $A_G$ and $A_B$ has a high contribution to the transmittance of the pixel A as a whole, the other sub-pixels $A_R$ and $A_B$ which have small influence on the transmittance of the pixel as a whole are preferably selected as sub-pixels through which the branch lines 310 are passed. For example, the sub-pixel through which the branch line 310 is passed may be selected taking into consideration the influence on the hue of the color displayed by the pixel as a whole.

For example, if the sub-pixel $A_B$ of the sub-pixels $A_R$, $A_G$ and $A_B$ has the smallest influence on the optical transmittance for the pixel A as a whole, the branch line 310 may be passed through the sub-pixels $A_B$ so as to suppress the influence on the optical transmittance for the pixel A as a whole to be small. Where the sub-pixel $A_R$ of the sub-pixels $A_R$, $A_G$ and $A_B$ has the smallest influence on the hue of the pixel A as a whole, the branch line 310 may be passed through the sub-pixels $A_R$ so as to suppress the influence on the hue of the pixel A as a whole to be small. Similarly, where it is appropriate to pass the branch line 310 through the sub-pixel $A_G$ of the sub-pixels $A_R$, $A_G$ and $A_B$, the branch line 310 is preferably passed through the sub-pixel $A_G$. Note that the hue of the pixel A can be solved through adjustment with the color of the backlight 20. For example, where the pixel A as a whole grows bluish as the branch line 310 is passed through the sub-pixel $A_R$, a backlight emitting slightly yellowish light can be selected so as to solve the problem, thus adjusting the hue of the pixel A as a whole. Conversely, which color of sub-pixels the branch lines 310 should be passed through may be selected based on the hue of the backlight to be employed.

Depending on the configuration of the liquid crystal panel 10, the configuration of the pixel A may not be such a configuration of the R, G and B sub-pixels $A_R$, $A_G$ and $A_B$ as shown in FIGS. 2 and 3. In such a case, the branch lines 310 are preferably routed so as to pass through appropriate ones of a plurality of sub-pixels. The branch lines 310 are preferably formed in the pixel region 10a, and may be for example routed along the source bus lines 43a so as not to interfere with the source bus lines 43a. Thus, they may be routed in portions of the array substrate 12 excluding openings (areas through which light passes). The branch lines 310 may be routed so as to pass through areas where the pixel electrodes 42a and 42b are formed.

Figure 18:
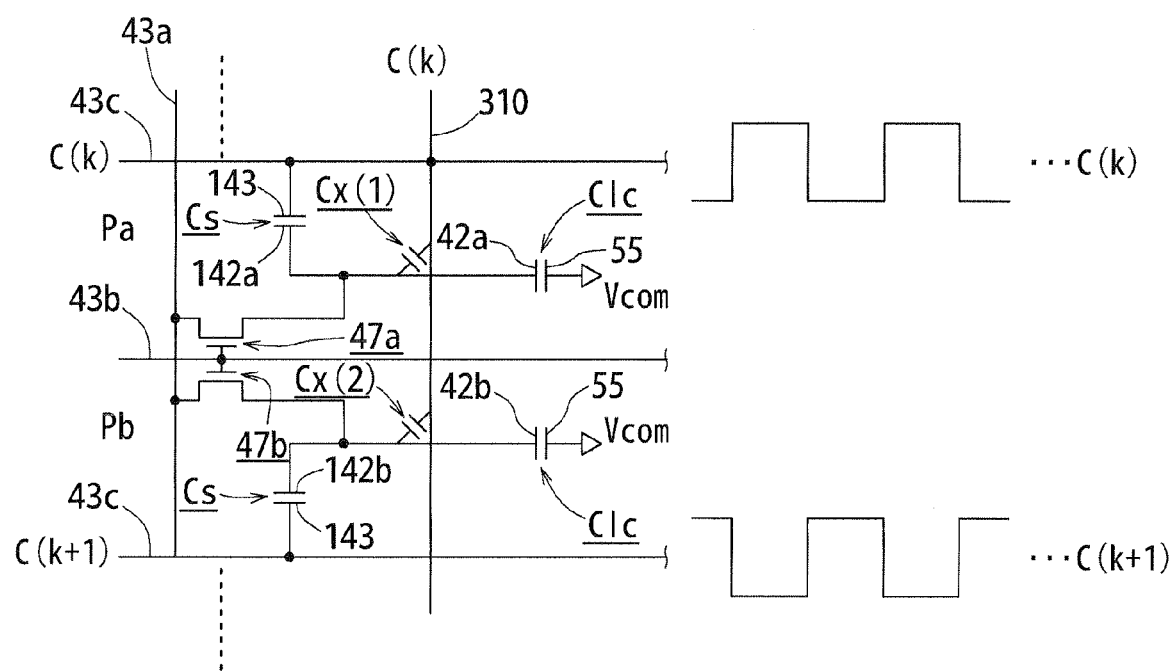
FIG. 18 A diagram showing an equivalent circuit of a liquid crystal panel according to an embodiment of the present invention.

Note that FIG. 18 shows an equivalent circuit in a case where the branch lines 310 are formed so as to pass through areas where the pixel electrodes 42a and 42b are formed. In this case, as shown in FIG. 18, capacitive couplings Cx(1)-Cx(2) may be formed between the pixel electrodes 42a and 42b of the subordinate pixels Pa and Pb and the branch line 310. In this case, the capacitive couplings Cx may vary the voltages of the pixel electrodes 42a and 42b depending on the control signals c(k) and c(k+1) supplied to the branch lines 310. Here, control signals c that are different from the control signals c supplied to storage capacitors Cc provided in the subordinate pixels Pa and Pb may be sent to the branch lines 310 routed so as to oppose the pixel electrodes 42a and 42b. For example, in the subordinate pixel Pb in the equivalent circuit shown in FIG. 18, the control signal c(k+1) sent to the storage capacitor Cs is different from the control signal c(k) supplied to the branch line 310 routed so as to pass through the area where the pixel electrode 42b of the subordinate pixel Pb is formed. In this case, in the subordinate pixel Pb, the voltage of the pixel electrode 42b is influenced by the capacitive coupling Cx(2). Since the influence of the capacitive coupling Cx is not even across all the pixels A, it produces a display non-uniformity, thus causing problems in terms of the display quality.

In this case, each of the subordinate pixels Pa and Pb is preferably configured so that Cx/(Clc+Cs+Cx)≤0.2 holds, where Clc is the capacitance formed by the counter electrode 55 and the pixel electrode 42a or 42b, Cs is the capacitance of the storage capacitor Cs, and Cx is the capacitance formed between the branch line 310 and the pixel electrode 42a or 42b, as shown in FIG. 18. With such a configuration that Cx/(Clc+Cs+Cx)≤0.2 holds, for the subordinate pixel Pa or Pb as a whole, the capacitive coupling Cx is not relatively very large as compared with the capacitance Clc formed by the counter electrode 55 and the pixel electrode 42a or 42b and the storage capacitance Cs. Therefore, it is possible to prevent a display non-uniformity from being perceived when the liquid crystal panel 10 is observed by human eyes, and to prevent problems in terms of the display quality.

Figure 19:
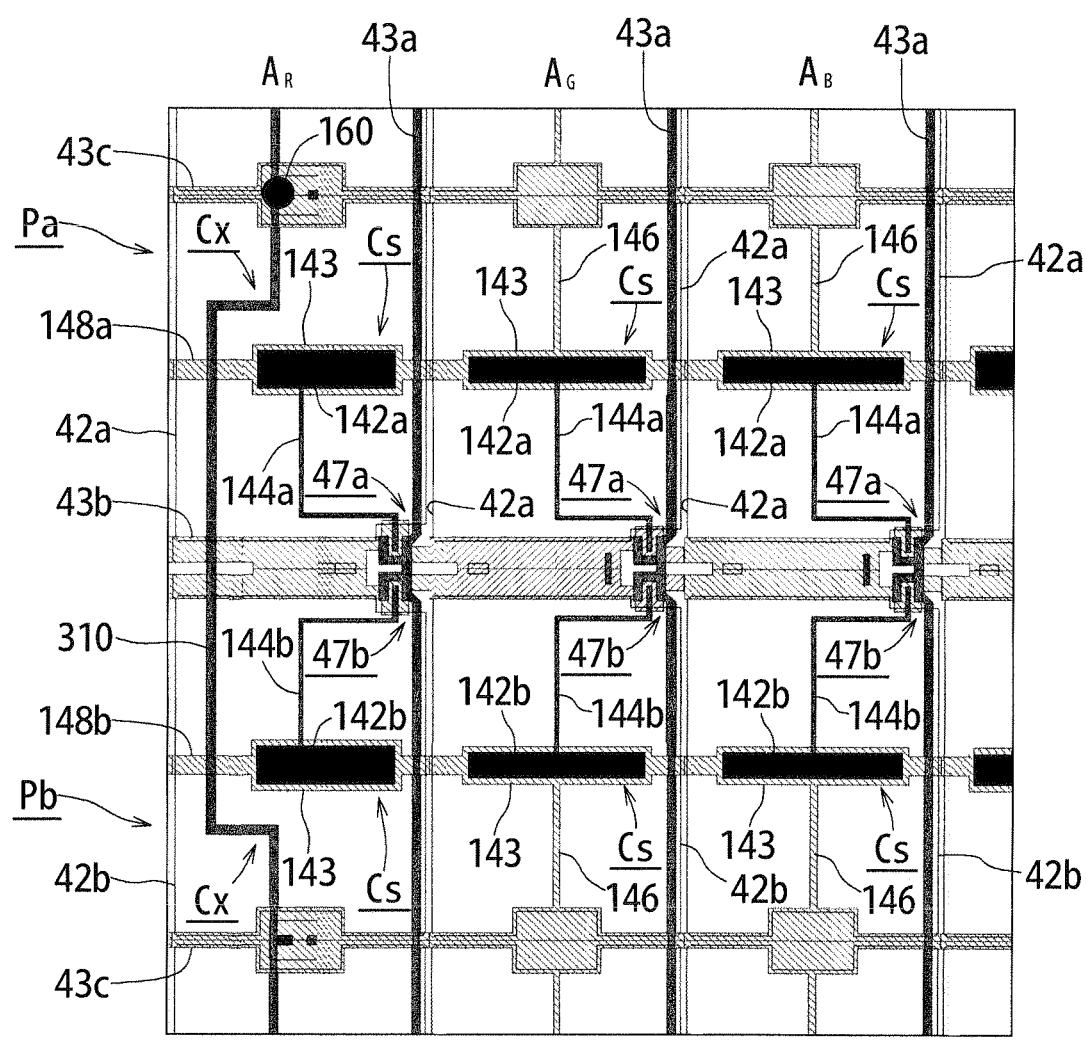
FIG. 19 A diagram showing a circuit configuration of a liquid crystal panel according to an embodiment of the present invention.
Figure 20:
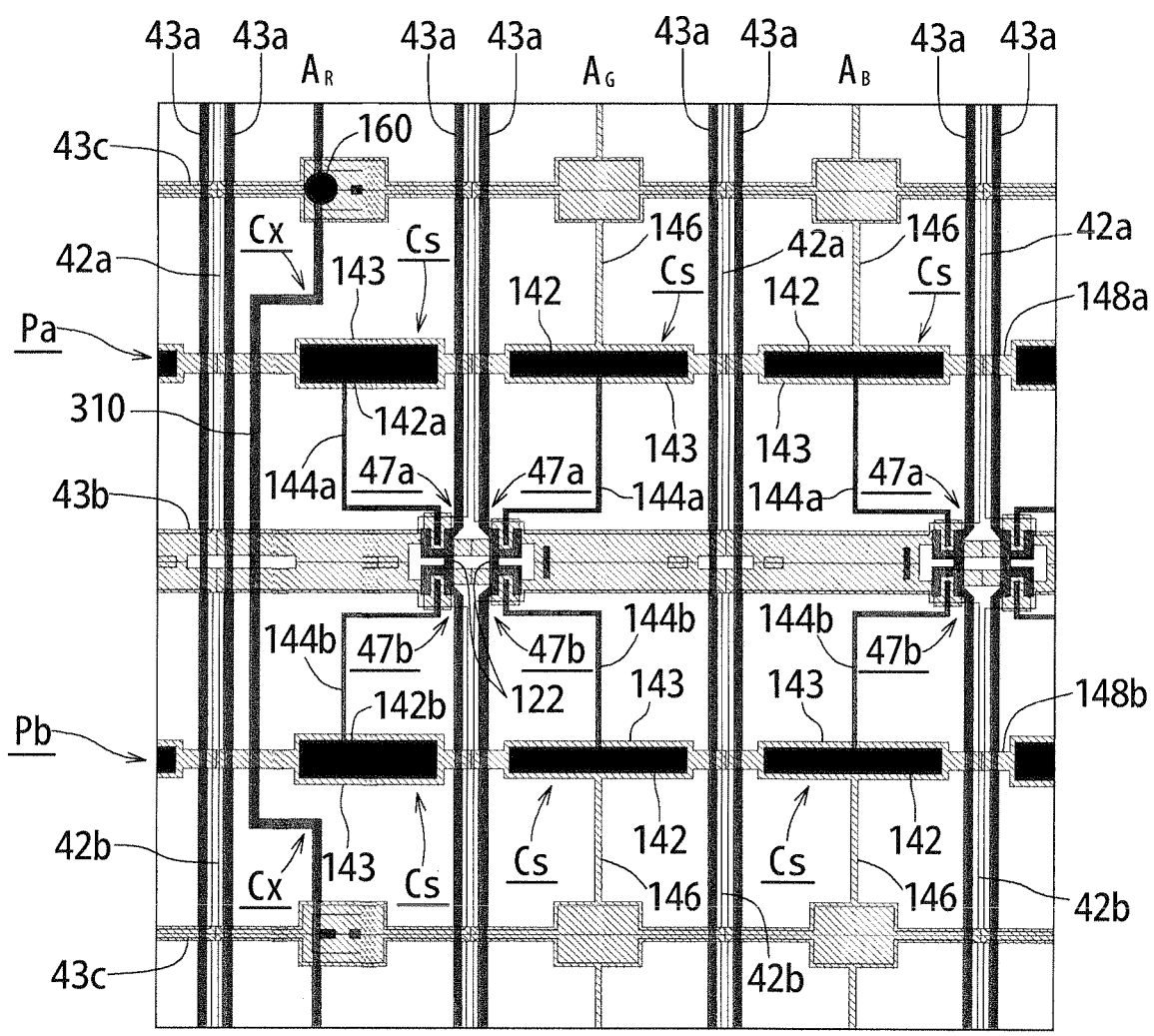
FIG. 20 A diagram showing a circuit configuration of a liquid crystal panel according to an embodiment of the present invention.
Figure 21:
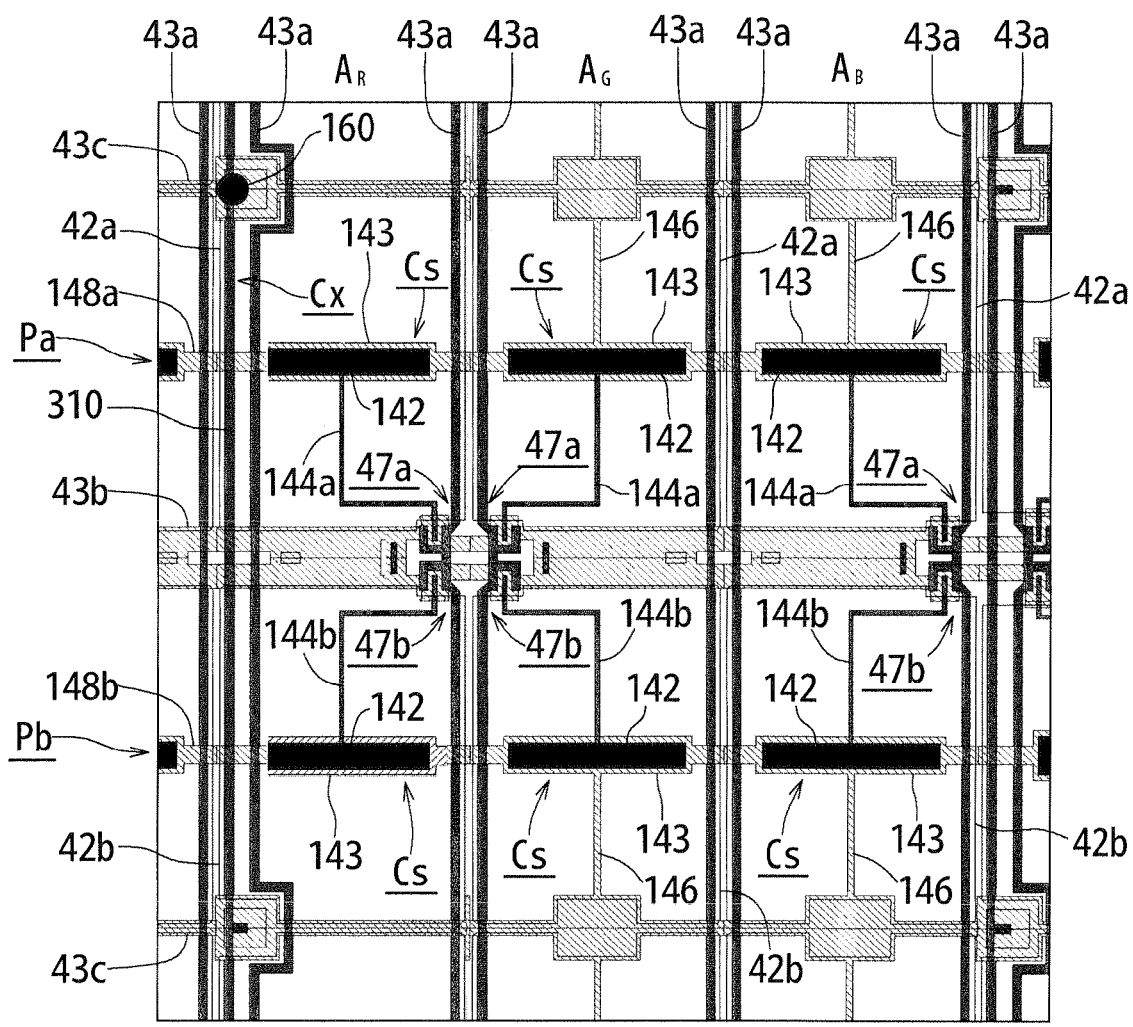
FIG. 21 A diagram showing a circuit configuration of a liquid crystal panel according to an embodiment of the present invention.

FIGS. 19 to 21 show embodiments where the branch lines 310 are routed through areas where the pixel electrodes 42a and 42b are formed as described above. In the embodiment shown in FIG. 19, one source bus line 43a is routed for every pair of subordinate pixels Pa and Pb. The storage capacitors Cs are formed generally in central portions of the areas in which the pixel electrodes 42a and 42b of the subordinate pixels Pa and Pb are formed. In this embodiment, the storage capacitor Cs includes an electrode 143 connected to the Cs bus line 43c and the storage capacitor electrode 142a or 142b opposing each other with an insulating layer interposed therebetween. The storage capacitor electrodes 142a and 142b are connected to the drain electrodes of the thin film transistors 47a and 47b by lead lines 144a and 144b, respectively. The electrodes 143 opposing the storage capacitor electrodes 142a and 142b are connected to the Cs bus lines 43c by lead lines 146. The electrodes 143 opposing the storage capacitor electrodes 142a and 142b are formed respectively in conductor layers 148a and 148b routed in the row direction. The branch line 310 is connected to the Cs bus line 43c through a contact hole 160. In this embodiment, the branch line 310 is routed so as to pass through the sub-pixel $A_R$ of the R, G and B sub-pixels $A_R$, $A_G$ and $A_B$.

FIG. 20 shows an embodiment similar to that of FIG. 19 except that two source bus lines 43a are routed for every pair of subordinate pixels Pa and Pb. In this case, the thin film transistors 47a and 47b may be provided so that the gate electrodes 122 face each other in adjacent subordinate pixels Pa and Pb. FIG. 21 shows an embodiment where the position where the branch line 310 is routed is brought closer to one edge portion of the pixel electrodes 42a and 42b. In this case, as shown in FIG. 18, the configuration is such that Cx/(Clc+Cs+Cx)≤0.2 holds by the unit of the subordinate pixels Pa and Pb. Then, even if the branch lines 310 are routed so as to pass through the areas where the pixel electrodes 42a and 42b are formed, it is possible to prevent problems in terms of the display quality due to the influence of the capacitive coupling Cx.

Figure 22:
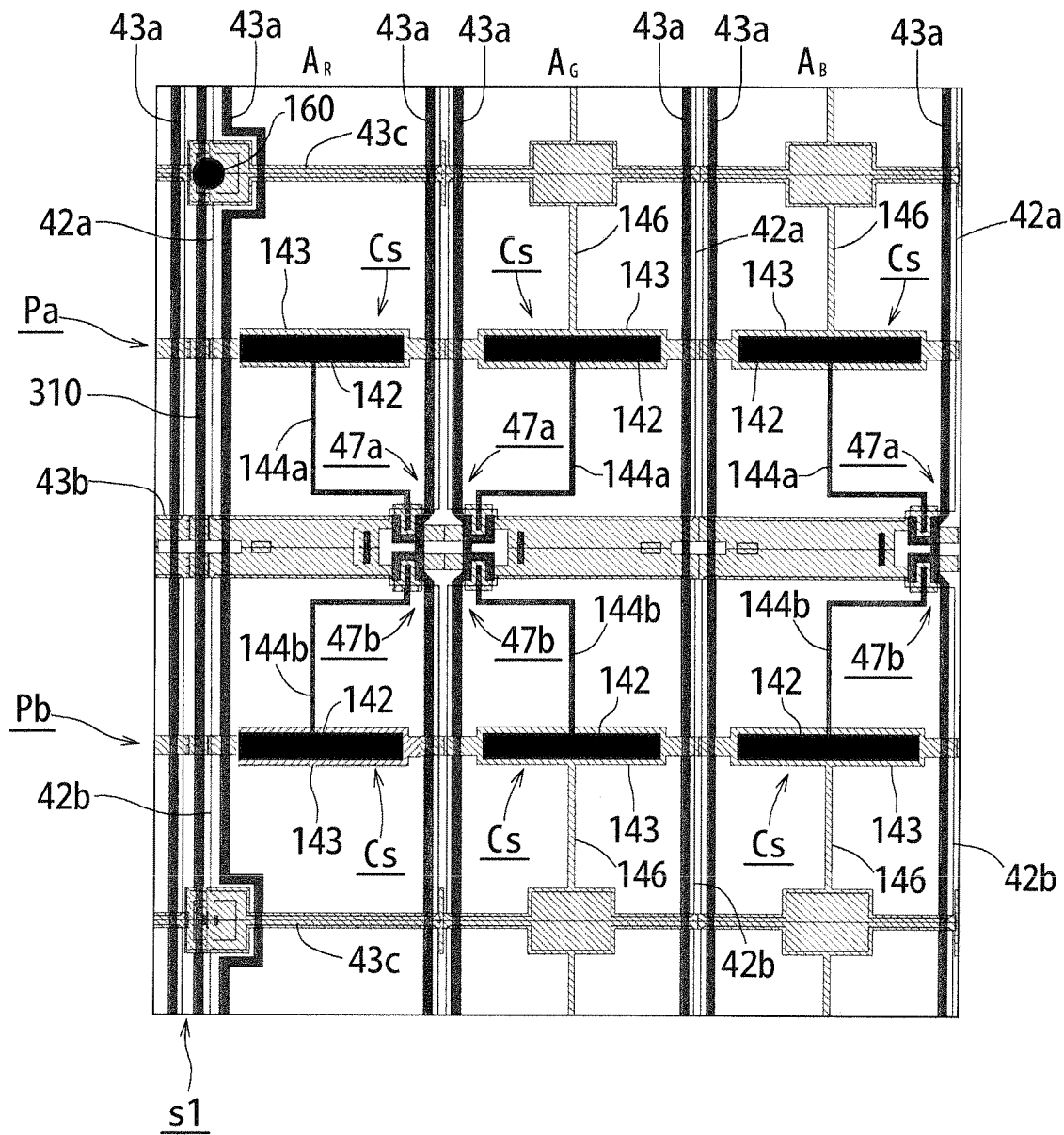
FIG. 22 A diagram showing a circuit configuration of a liquid crystal panel according to an embodiment of the present invention.
Figure 23:
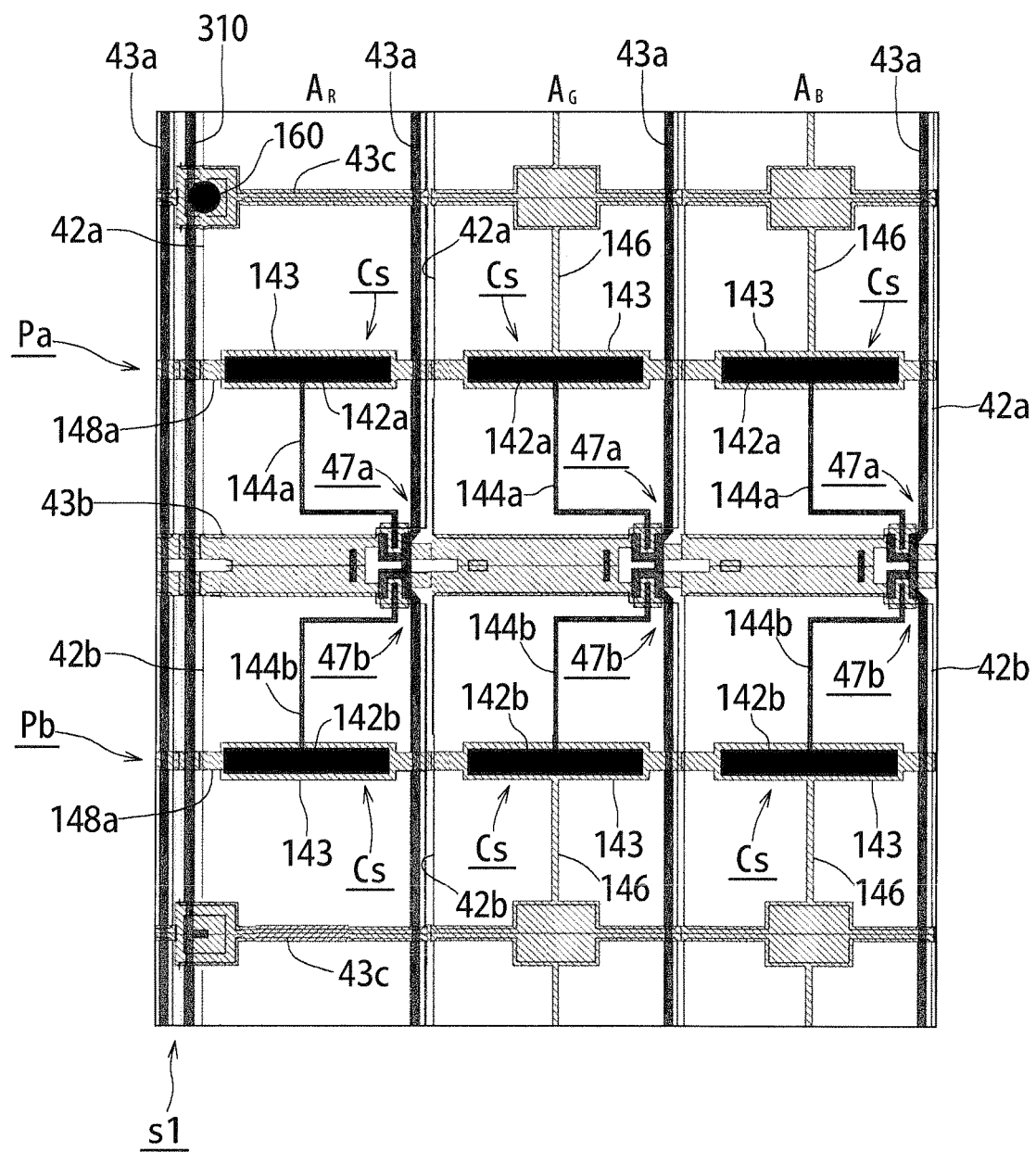
FIG. 23 A diagram showing a circuit configuration of a liquid crystal panel according to an embodiment of the present invention.
Figure 24:
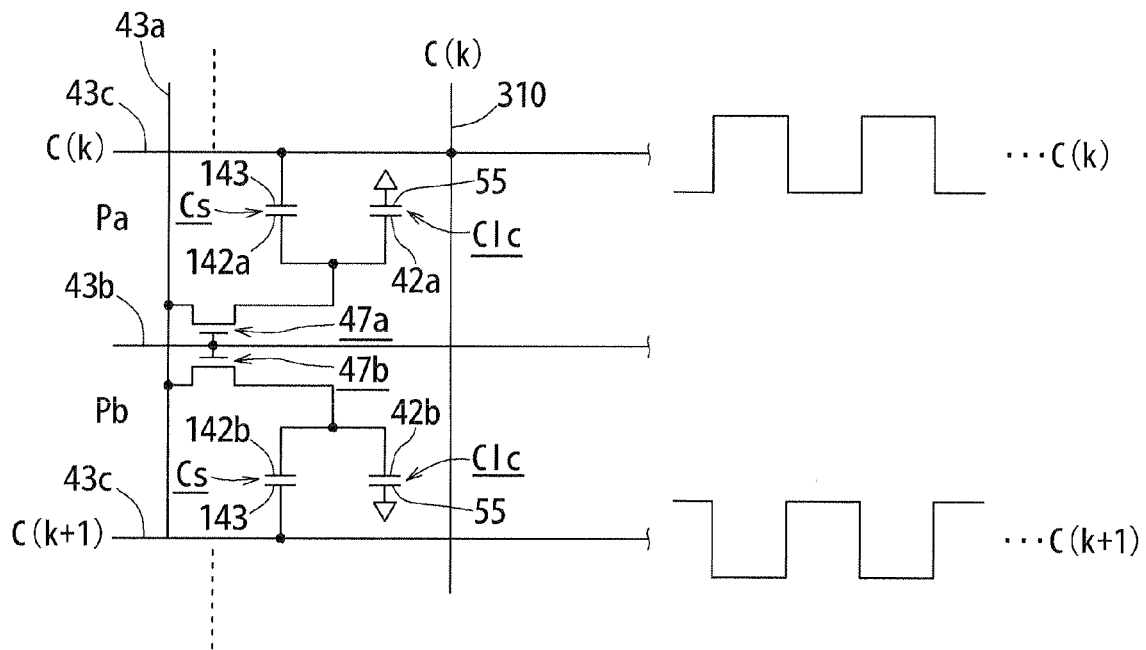
FIG. 24 A diagram showing an equivalent circuit of a liquid crystal panel according to an embodiment of the present invention.

As shown in FIGS. 22 and 23, a gap s1 may be formed between the pixel electrodes 42a and 42b and the branch line 310 may be routed so as to pass through the gap s1. An equivalent circuit in this case is as shown in FIG. 24. In this case, as shown in FIG. 24, the branch line 310 is routed through the gap s1 formed between the pixel electrodes 42a and 42b. Therefore, the capacitive coupling Cx is not formed, and there are no problems in terms of the display quality due to the influence of the capacitive coupling Cx.

For example, with the multi-pixel driving, one sub-pixel is formed by two subordinate pixels as shown in FIGS. 5 and 8. One of the two subordinate pixels becomes brighter as the control signal of the storage capacitor Cs changes from the high level to the low level. The other subordinate pixel becomes darker as the control signal of the storage capacitor Cs changes from the low level to the high level. Therefore, with the multi-pixel driving, as shown in FIGS. 5 and 8, a pair of control signals whose signal voltage changes are of opposite directions and of an equal amount are sent to two subordinate pixels forming one sub-pixel.

Figure 25:
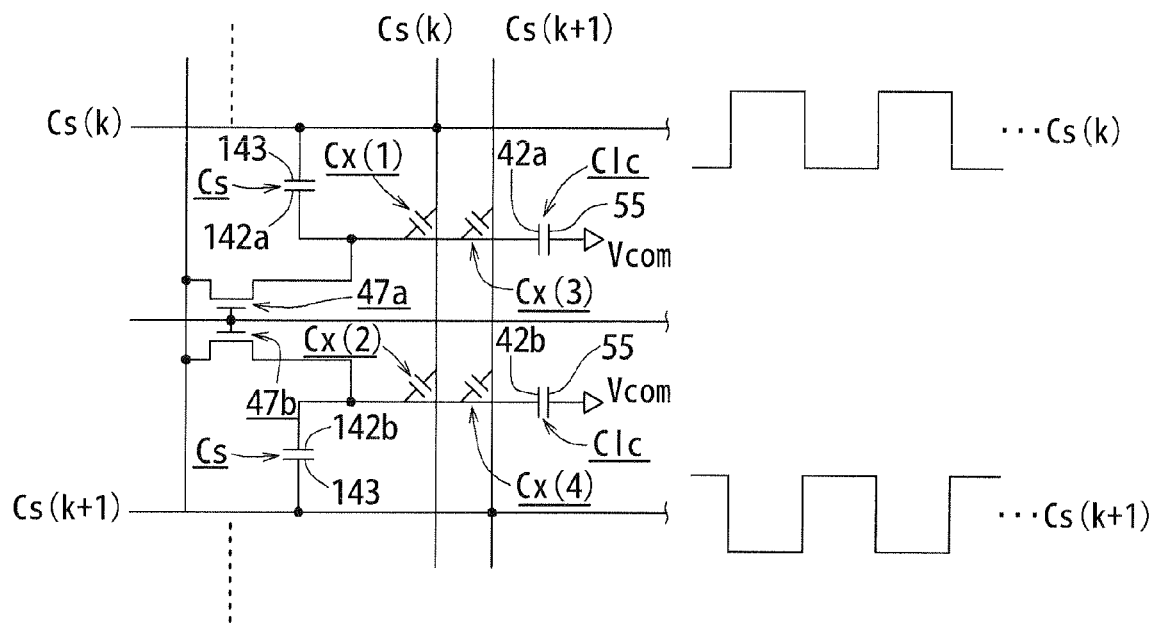
FIG. 25 A diagram showing an equivalent circuit of a liquid crystal panel according to an embodiment of the present invention.
Figure 26:
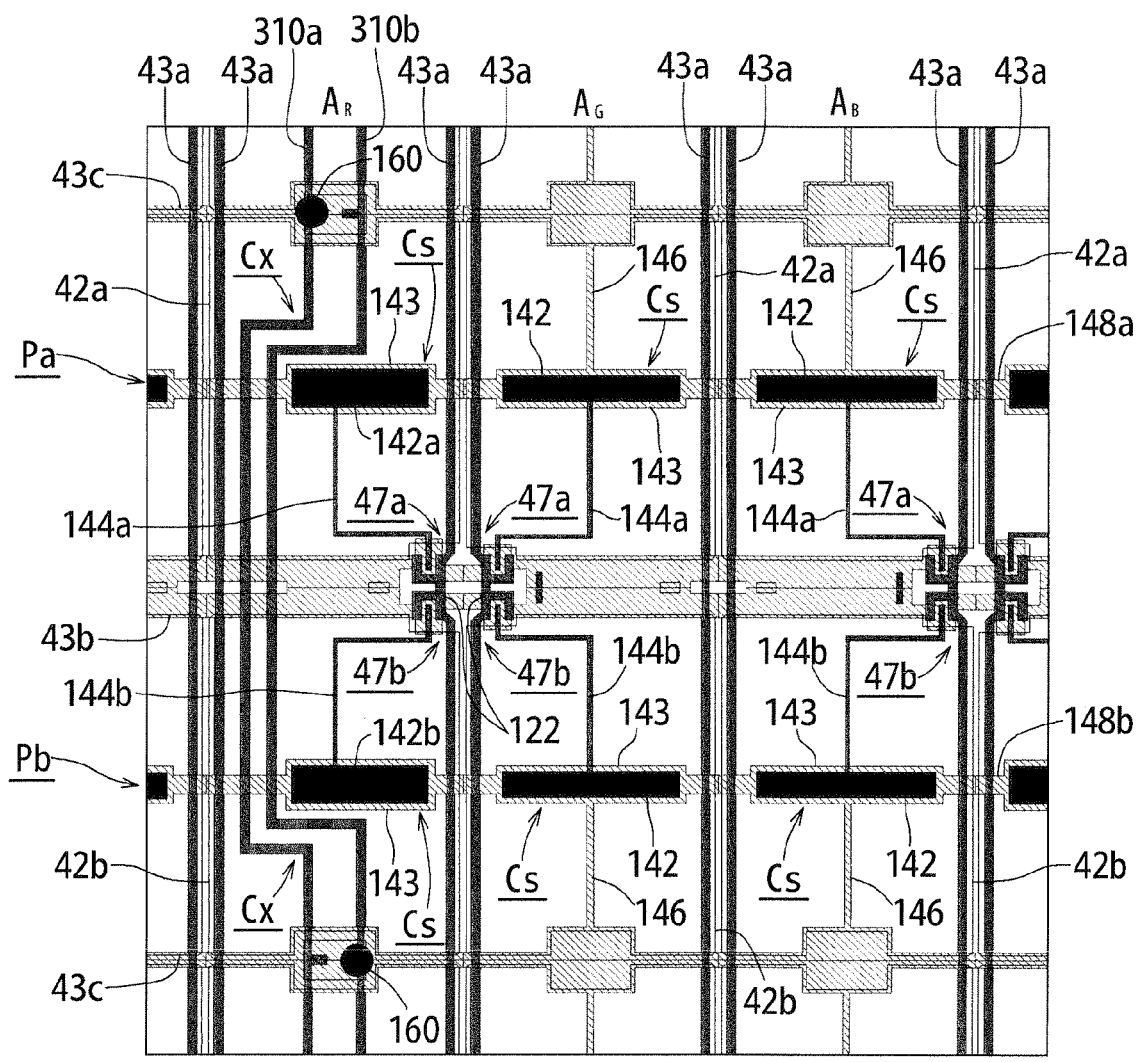
FIG. 26 A diagram showing a circuit configuration of a liquid crystal panel according to an embodiment of the present invention.
Figure 27:
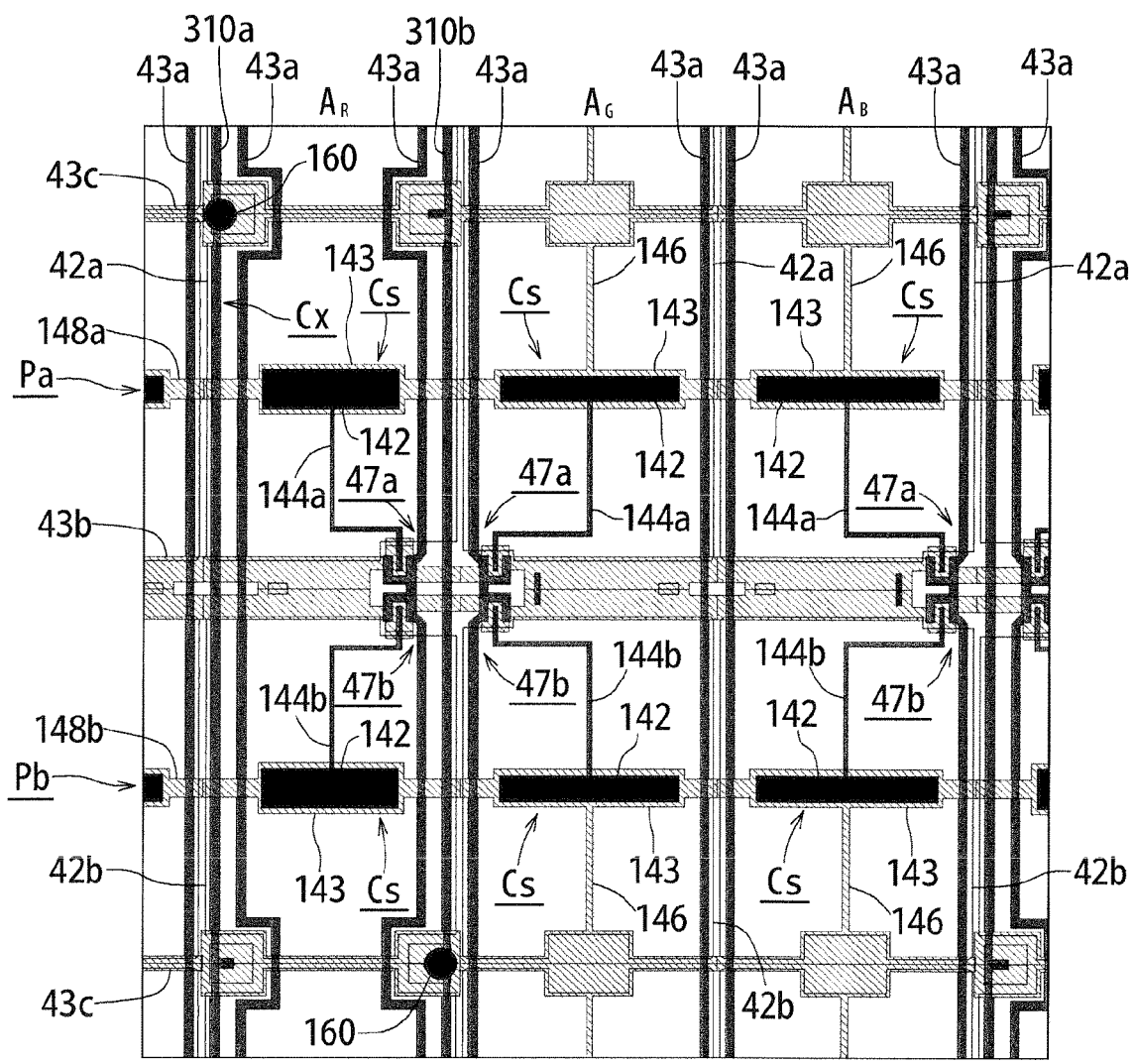
FIG. 27 A diagram showing a circuit configuration of a liquid crystal panel according to an embodiment of the present invention.
Figure 28:
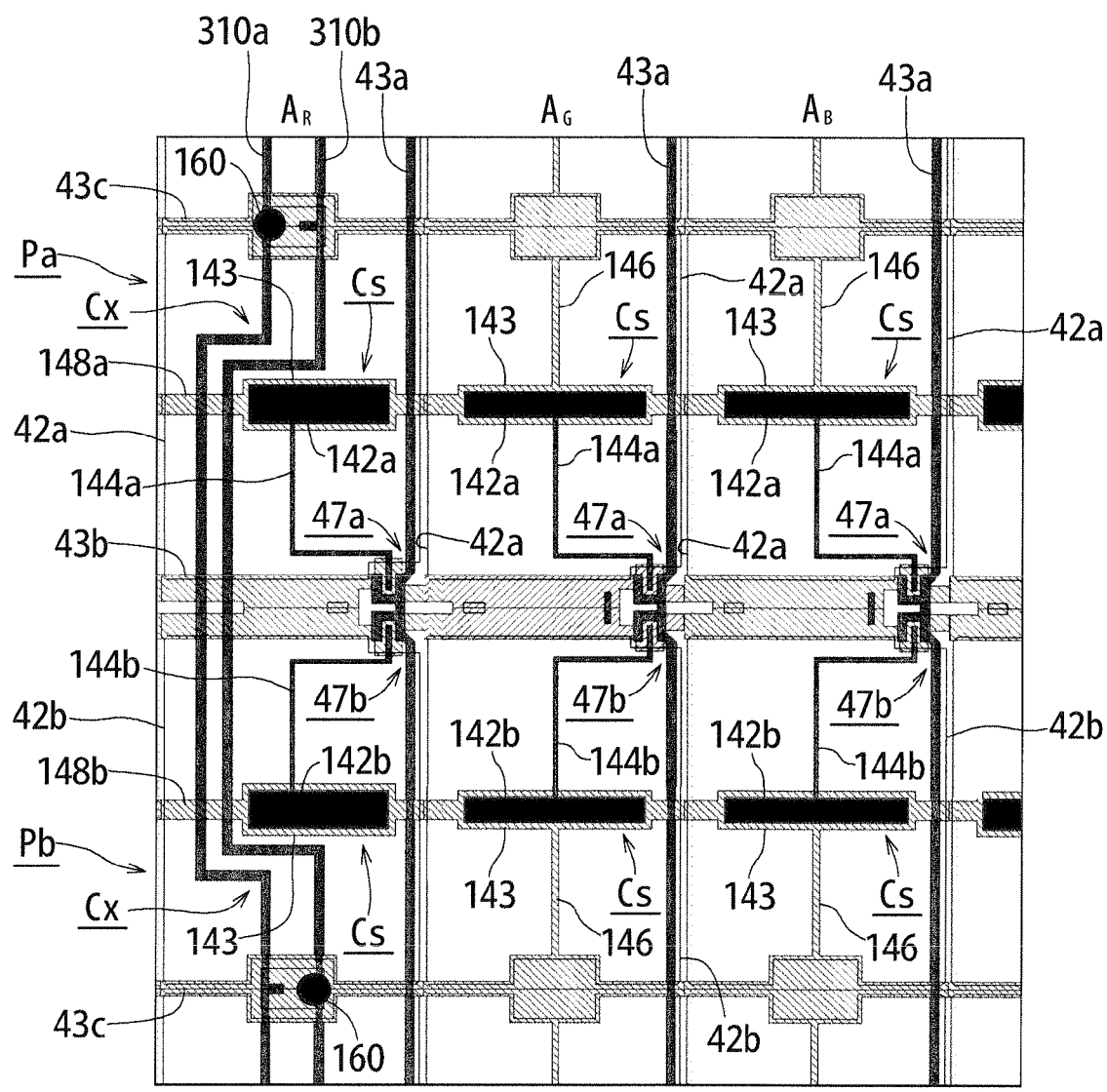
FIG. 28 A diagram showing a circuit configuration of a liquid crystal panel according to an embodiment of the present invention.
Figure 29:
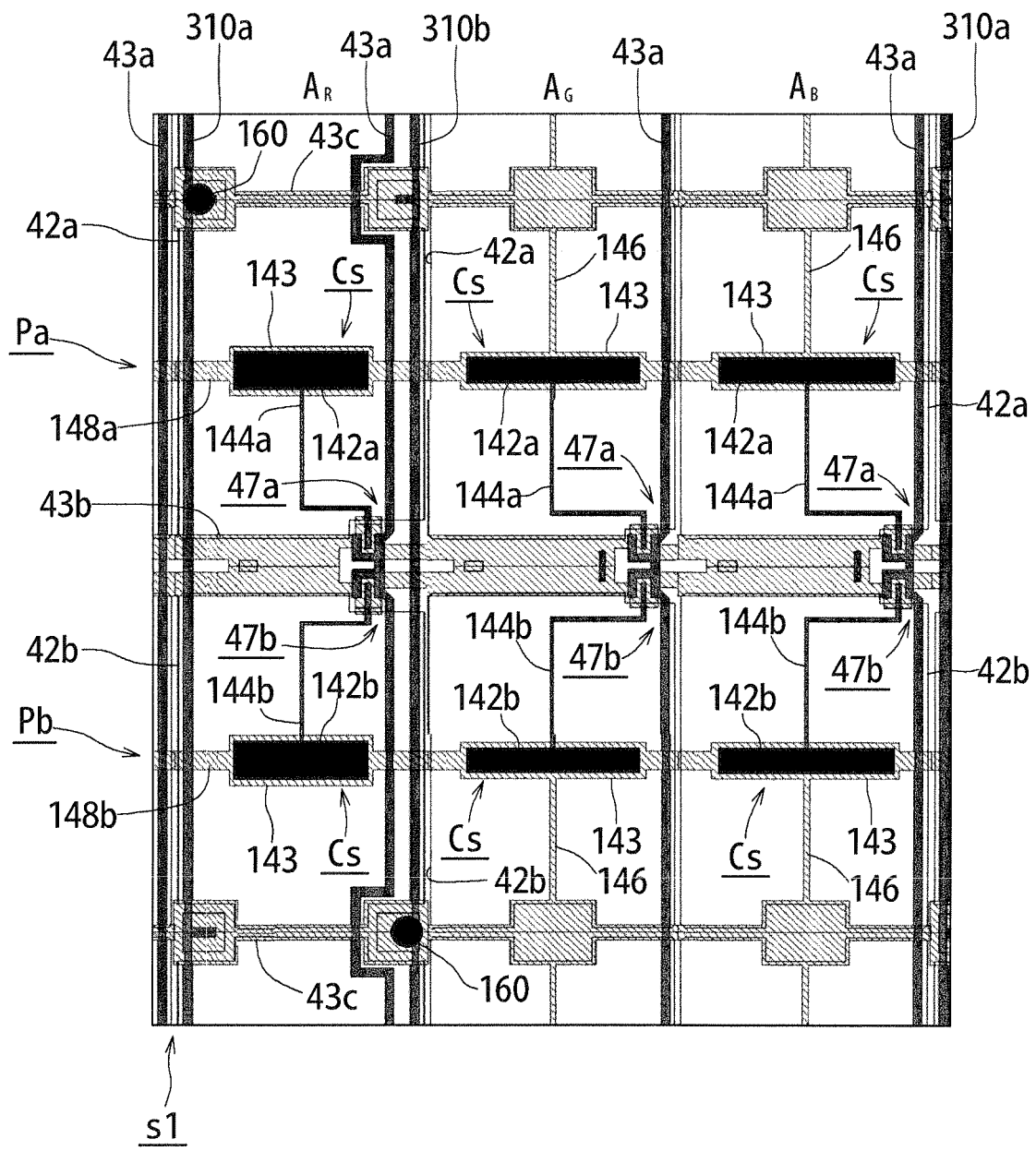
FIG. 29 A diagram showing a circuit configuration of a liquid crystal panel according to an embodiment of the present invention.

In this case, two branch lines 310 are routed so as to pass through the areas where the pixel electrodes 42a and 42b are formed. A pair of control signals c(k) and c(k+1) whose signal voltage changes are of opposite directions and of an equal amount may be supplied to the two branch lines 310. An equivalent circuit in this case is shown in FIG. 25. In this case, the capacitive couplings Cx(1)-Cx(4) are formed between the pixel electrodes 42a and 42b of the subordinate pixels Pa and Pb and the branch lines 310. However, a pair of control signals c(k) and c(k+1) whose signal voltage changes are of opposite directions and of an equal amount are supplied to the two branch lines 310 passing through the areas where the pixel electrodes 42a and 42b are formed. Therefore, the influences from the capacitive couplings Cx(1) and Cx(3) formed in the subordinate pixel Pa are canceled out by each other. Therefore, the influences from the capacitive couplings Cx(2) and Cx(4) formed in the subordinate pixel Pb are also canceled out by each other. Thus, even in a case where the branch lines 310 are routed so as to pass through the areas where the pixel electrodes 42a and 42b of the subordinate pixels Pa and Pb are formed, it is possible to prevent problems in terms of the display quality due to the influence of the capacitive coupling Cx.

Note that in this case, the capacitances of the capacitive couplings Cx(1) and Cx(3) formed between the branch line 310 and the pixel electrode 42a may be made equal to each other. The capacitances of the capacitive couplings Cx(2) and Cx(4) formed between the branch line 310 and the pixel electrode 42b may also be made equal to each other. Then, the effect of canceling out the influences from the capacitive couplings Cx(1)-Cx(4) is enhanced. In a case where a plurality of capacitive couplings Cx are formed in one subordinate pixel Pa or Pb, it is preferred that the largest value of the capacitances of the plurality of capacitive couplings Cx is less than or equal to twice the smallest value. That is, it is preferred that the largest value of the capacitances of the capacitive couplings Cx(1) and Cx(3) is less than or equal to twice the smallest value. It is preferred that the largest value of the capacitances of the capacitive couplings Cx(2) and Cx(4) is less than or equal to twice the smallest value. It is more preferred that the largest value of the plurality of capacitances is less than or equal to 1.5 times the smallest value.

In a case where a plurality of branch lines 310 are routed so as to pass through the areas where the pixel electrodes 42a and 42b of the subordinate pixels Pa and Pb are formed, areas over which the branch lines 310 as projected onto the pixel electrodes 42a and 42b overlap the pixel electrodes 42a and 42b may be made equal to each other. For example, the areas over which the branch lines 310 overlap the pixel electrodes 42a and 42b as viewed in a plan view of the substrate on which the pixel electrodes 42a and 42b are formed are preferably made equal between the plurality of branch lines. Then, the capacitances of the plurality of capacitive couplings Cx formed by the plurality of branch lines 310 and the pixel electrodes 42a and 42b become approximate to each other. Thus, the effect of canceling out the influences from the plurality of capacitive couplings is increased. The largest value of the areas over which the branch lines 310 as projected onto the pixel electrodes 42a and 42b overlap the pixel electrodes 42a and 42b is preferably less than or equal to twice the smallest value. In this case, more preferably, the largest value of the areas over which the branch lines 310 as projected onto the pixel electrodes 42a and 42b overlap the pixel electrodes 42a and 42b is less than or equal to 1.5 times the smallest value. Thus, as the areas over which the branch lines 310 overlap the pixel electrodes 42a and 42b as viewed in a plan view of the substrate on which the pixel electrodes 42a and 42b are formed are closer to each other among the plurality of branch lines, the capacitances of the plurality of capacitive couplings Cx are more approximate to each other, thereby increasing the effect of canceling out the influences from the plurality of capacitive couplings.

In this case, FIGS. 26 to 29 each show a multi-pixel driving embodiment in which two branch lines 310a and 310b that receive a pair of control signals whose signal voltage changes are of opposite directions and of an equal amount are routed so as to pass through the areas where the pixel electrodes 42a and 42b of the subordinate pixels Pa and Pb are formed.

As described above, as shown in FIG. 13, a plurality of branch lines 310 are routed along the column direction across the pixel region 10a where a plurality of Cs bus lines 43c (storage capacitor lines) are routed along the row direction. The branch lines 310 are connected to the Cs bus lines 43c so that control signals are sent to the storage capacitors from the branch lines 310 through the Cs bus lines 43c. By thus forming a plurality of wiring paths for sending the control signals c from the branch lines 310 to the storage capacitors Cs through the Cs bus lines 43c, the resistance of a wiring path for sending the control signal c to the storage capacitor Cs can be reduced, and the "waveform rounding" of the control signal c sent to the storage capacitor Cs can be suppressed to be small.

Figure 30:
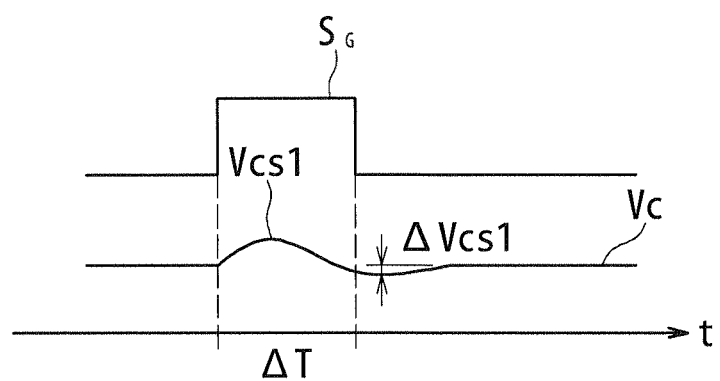
FIG. 30 A diagram showing ripples occurring on a storage capacitor line.

Now, the branch lines 310 also have an effect of reducing a ripple Vcs1 occurring on the Cs bus line 43c. That is, as shown in FIGS. 5 and 30, in the liquid crystal panel 10, one electrode of the storage capacitor Cs is formed by a portion of the pixel electrode 42a or 42b. A required voltage is applied to the pixel electrodes 42a and 42b of the pixel A from the source driver 71 through the source bus line 43a at the timing ΔT at which the thin film transistor 47 is turned ON by a scanning signal SG. When a required voltage is applied to the pixel electrodes 42a and 42b, the ripple Vcs1 may occur on the Cs bus line 43c connected to the pixel electrode 42 via the storage capacitor Cs.

The ripple Vcs1 may remain on the Cs bus line 43c without attenuating even after the thin film transistor 47 is turned OFF. If the ripple Vcs1 remains on the Cs bus line 43c without attenuating even after the thin film transistor 47 is turned OFF, it may influence the voltages applied to the condensers Clc for operating the liquid crystal layer 13 of a plurality of pixels A connected to the Cs bus line 43c. With the liquid crystal panel 10 described above, however, Cs bus lines 43c are connected to other Cs bus lines 43c by the branch lines 310. Therefore, the ripple Vcs1 occurring on a Cs bus line 43c diffuses to other Cs bus lines 43c through the branch lines 310 and therefore attenuates quickly. Thus, the disturbance of an image due to the ripple Vcs1 is reduced. Thus, by the provision of the branch lines 310, the liquid crystal panel 10 can reduce the disturbance of an image due to the ripple Vcs1.

While the liquid crystal display device according to one embodiment of the present invention has been described above, the present invention is not limited to the embodiment described above, and various changes can be made thereto.

For example, the specific configuration of the liquid crystal display device is not limited to the embodiment described above. Particularly, various changes can be made in, for example, how the Cs bus lines (storage capacitor lines), the stem lines, the branch lines and the horizontal stem lines are routed or connected together. In the embodiment described above, one pixel A includes the R, G and B sub-pixels $A_R$, $A_G$ and $A_B$, and each of the sub-pixels $A_R$, $A_G$ and $A_B$ further includes upper and lower subordinate pixels Pa and Pb. The upper and lower subordinate pixels Pa and Pb operate individually. Thus, in the embodiment described above, a liquid crystal panel of a multi-pixel driving type is illustrated. The structure of the liquid crystal panel is not particularly limited to a liquid crystal panel of a multi-pixel driving type. While a structure where a backlight is placed directly under the liquid crystal panel so as to oppose the liquid crystal panel has been illustrated as a specific configuration of the liquid crystal display device, a so-called edge light type may also be employed. The liquid crystal panel of the present invention can be used as a liquid crystal panel of a liquid crystal projector, or the like.

DESCRIPTION OF REFERENCE CHARACTERS

10 Liquid crystal panel
10a Pixel region
11 Color filter substrate
12 Array substrate
13 Liquid crystal layer
15 Sealant
17, 18 Polarizer plate
20 Backlight
22 Light source
24 Backlight chassis
26 Optical sheet
30 Bezel
32 Frame
42 Pixel electrode
42a, 42b Pixel electrode (of subordinate pixel)
43a Source bus line
43b Gate bus line
43c Cs bus line (storage capacitor line)
46 Alignment film
47, 47a, 47b Thin film transistor
52 Black matrix
53 Color filter
55 Counter electrode
59 Spacer
71 Source driver
72 Gate driver
100 Liquid crystal display device
121 Source electrode
122 Gate electrode
123a, 123b Drain electrode
142a, 142b Storage capacitor electrode
144a, 144b Lead line
180 Group of stem lines
181-184 Stem line
190 Control signal supply section
200 Control section
201 Signal input section
202 Timing control section
203 Power supply
310 Branch line
320 Horizontal stem lines
A Pixel
$A_R$, $A_G$, $A_B$ Sub-pixel
c Control signal of storage capacitor
Clc Condenser for operating liquid crystal layer
Cs Storage capacitor
e Charge
Pa, Pb Subordinate pixel
SG Scanning signal
Vcs1 Ripple

The invention claimed is:

1. A liquid crystal panel comprising:
a plurality of pixels provided in a pixel region, the plurality of pixels being arranged in the pixel region in a matrix pattern having rows and columns;
an edge portion provided outside of the pixel region;
a storage capacitor provided in each pixel;
a plurality of storage capacitor lines routed in a row direction and connected to the storage capacitors arranged in the row direction;
a plurality of branch lines routed in a column direction; and
a control signal supply section connected to the branch lines for sending a control signal to the storage capacitors from the branch lines through the storage capacitor lines,
wherein the liquid crystal panel includes a stem line routed in the edge portion in the row direction, with the storage capacitor lines connected to the stem line;
wherein the stem line is connected to the control signal supply section, and a control signal is sent to the storage capacitors from the stem line through the storage capacitor lines;
wherein the liquid crystal panel includes a horizontal stem line routed in the edge portion in the column direction; and
wherein the branch line is connected to the horizontal stem line.

2. The liquid crystal panel according to claim 1, wherein:
the plurality of branch lines are grouped into a plurality of groups, and are connected to the control signal supply section so that the same control signal is sent to branch lines belonging to the same group; and
the plurality of storage capacitor lines are each connected to branch lines belonging to one group.

3. The liquid crystal panel according to claim 2, wherein:
the liquid crystal panel includes a plurality of stem lines routed in at least one edge portion in the row direction;
each storage capacitor line is connected to one of the plurality of stem lines; and
the same control signal as the control signal sent to the branch lines belonging to one group to which the storage capacitor line is connected is sent to the stem line by the control signal supply section.

4. The liquid crystal panel according to claim 2, wherein:
the liquid crystal panel includes a plurality of horizontal stem lines routed in an edge portion in the column direction; and
the branch lines belonging to one group are connected to one horizontal stem line that is different from horizontal stem lines to which branch lines of other groups are connected.

5. The liquid crystal panel according to claim 1, wherein the branch lines are routed evenly across different pixels.

6. The liquid crystal panel according to claim 1, wherein each pixel includes R, G and B sub-pixels, and the branch lines are routed so as to pass through R sub-pixels of the R, G and B sub-pixels.

7. The liquid crystal panel according to claim 1, wherein each pixel includes R, G and B sub-pixels, and the branch lines are routed so as to pass through G sub-pixels of the R, G and B sub-pixels.

8. The liquid crystal panel according to 1, wherein each pixel includes R, G and B sub-pixels, and the branch lines are routed so as to pass through B sub-pixels of the R, G and B sub-pixels.

9. The liquid crystal panel according to claim 1, comprising:
a liquid crystal layer;
a pair of substrates with the liquid crystal layer interposed therebetween;
a counter electrode formed on one of the pair of substrates; and
a pixel electrode formed on the other substrate opposing the counter electrode,
wherein two branch lines that receive a pair of control signals whose signal voltage changes are of opposite directions and of an equal amount are routed so as to pass through an area where the pixel electrode is formed.

10. The liquid crystal panel according to claim 1, comprising:
- a liquid crystal layer;
- a pair of substrates with the liquid crystal layer interposed therebetween;
- a counter electrode formed on one of the pair of substrates; and
- a pixel electrode formed on the other substrate opposing the counter electrode, wherein:
- a plurality of branch lines are routed so as to pass through an area where the pixel electrode of the pixel is formed; and
- capacitances formed between the branch lines and the pixel electrode are equal to each other.

11. The liquid crystal panel according to claim 1, comprising:
- a liquid crystal layer;
- a pair of substrates with the liquid crystal layer interposed therebetween;
- a counter electrode formed on one of the pair of substrates; and
- a pixel electrode formed on the other substrate opposing the counter electrode, wherein:
- a plurality of branch lines are routed so as to pass through an area where the pixel electrode of the pixel is formed; and
- a largest value of a plurality of capacitances formed between the branch lines and the pixel electrode is less than or equal to twice a smallest value thereof.

12. The liquid crystal panel according to claim 1, comprising:
- a liquid crystal layer;
- a pair of substrates with the liquid crystal layer interposed therebetween;
- a counter electrode formed on one of the pair of substrates; and
- a pixel electrode formed on the other substrate opposing the counter electrode, wherein:
- a plurality of branch lines are routed so as to pass through an area where the pixel electrode of the pixel is formed; and
- areas over which the branch lines as projected onto the pixel electrode overlap the pixel electrode are equal to each other.

13. The liquid crystal panel according to claim 1, comprising:
- a liquid crystal layer;
- a pair of substrates with the liquid crystal layer interposed therebetween;
- a counter electrode formed on one of the pair of substrates; and
- a pixel electrode formed on the other substrate opposing the counter electrode, wherein:
- a plurality of branch lines are routed so as to pass through an area where the pixel electrode of the pixel is formed; and
- a largest value of areas over which the branch lines as projected onto the pixel electrode overlap the pixel electrode is less than or equal to twice a smallest value thereof.

14. The liquid crystal panel according to claim 1, comprising:
- a liquid crystal layer;
- a pair of substrates with the liquid crystal layer interposed therebetween;
- a counter electrode formed on one of the pair of substrates; and
- a pixel electrode formed on the other substrate opposing the counter electrode, wherein:
- the branch lines are routed so as to pass through an area where the pixel electrode of the pixel is formed; and
- $Cx/(Clc+Cs+Cx) \leq 0.2$ holds, where
- Clc is a capacitance formed by the counter electrode and the pixel electrode,
- Cs is a capacitance of the storage capacitor, and
- Cx is a capacitance formed between the branch line and the pixel electrode.

15. The liquid crystal panel according to claim 1, comprising:
- a liquid crystal layer;
- a pair of substrates with the liquid crystal layer interposed therebetween;
- a counter electrode formed on one of the pair of substrates; and
- a pixel electrode formed on the other substrate opposing the counter electrode,
- wherein a gap is formed between the pixel electrodes and the branch line is routed so as to pass through the gap.

16. The liquid crystal panel according to claim 1, wherein:
- each pixel includes subordinate pixels having different brightness levels;
- the subordinate pixels having different brightness levels include storage apacitors connected to different storage capacitor lines; and
- the storage capacitors provided in the subordinate pixels having different brightness levels receive a pair of control signals whose signal voltage changes are of opposite directions and of an equal amount through the different storage capacitor lines.

17. A liquid crystal display device comprising the liquid crystal panel according to claim 1.

18. A liquid crystal TV comprising the liquid crystal display device according to claim 17.

19. The liquid crystal panel according to claim 1, wherein the horizontal stem line is routed in the edge portion between a source driver and the pixel region.

20. The liquid crystal panel according to claim 19, wherein the branch line is connected to the horizontal stem line.

21. The liquid crystal panel according to claim 19, wherein:
- the plurality of branch lines are grouped into a plurality of groups, and are connected to the control signal supply section so that the same control signal is sent to branch lines belonging to the same group; and
- the plurality of storage capacitor lines are each connected to branch lines belonging to one group.

22. The liquid crystal panel according to claim 21, wherein:
- the liquid crystal panel includes a plurality of stem lines routed in at least one edge portion in the row direction;
- each storage capacitor line is connected to one of the plurality of stem lines; and
- the same control signal as the control signal sent to the branch lines belonging to one group to which the storage capacitor line is connected is sent to the stem line by the control signal supply section.

23. The liquid crystal panel according to claim 21, wherein:
- the liquid crystal panel includes a plurality of horizontal stem lines routed in an edge portion in the column direction; and
- the branch lines belonging to one group are connected to one horizontal stem line that is different from horizontal stem lines to which branch lines of other groups are connected.

24. The liquid crystal panel according to claim 19, wherein the branch lines are routed evenly across different pixels.

25. The liquid crystal panel according to claim 19, wherein each pixel includes R, G and B sub-pixels, and the branch lines are routed so as to pass through R sub-pixels of the R, G and B sub-pixels.

26. The liquid crystal panel according to claim 19, wherein each pixel includes R, G and B sub-pixels, and the branch lines are routed so as to pass through G sub-pixels of the R, G and B sub-pixels.

27. The liquid crystal panel according to claim 19, wherein each pixel includes R, G and B sub-pixels, and the branch lines are routed so as to pass through B sub-pixels of the R, G and B sub-pixels.

28. The liquid crystal panel according to claim 19, comprising:
a liquid crystal layer;
a pair of substrates with the liquid crystal layer interposed therebetween;
a counter electrode formed on one of the pair of substrates; and
a pixel electrode formed on the other substrate opposing the counter electrode,
wherein two branch lines that receive a pair of control signals whose signal voltage changes are of opposite directions and of an equal amount are routed so as to pass through an area where the pixel electrode is formed.

29. The liquid crystal panel according to claim 19, comprising:
a liquid crystal layer;
a pair of substrates with the liquid crystal layer interposed therebetween;
a counter electrode formed on one of the pair of substrates; and
a pixel electrode formed on the other substrate opposing the counter electrode, wherein:
a plurality of branch lines are routed so as to pass through an area where the pixel electrode of the pixel is formed; and
capacitances formed between the branch lines and the pixel electrode are equal to each other.

30. The liquid crystal panel according to claim 19, comprising:
a liquid crystal layer;
a pair of substrates with the liquid crystal layer interposed therebetween;
a counter electrode formed on one of the pair of substrates; and
a pixel electrode formed on the other substrate opposing the counter electrode, wherein:
a plurality of branch lines are routed so as to pass through an area where the pixel electrode of the pixel is formed; and
a largest value of a plurality of capacitances formed between the branch lines and the pixel electrode is less than or equal to twice a smallest value thereof.

31. The liquid crystal panel according to claim 19, comprising:
a liquid crystal layer;
a pair of substrates with the liquid crystal layer interposed therebetween;
a counter electrode formed on one of the pair of substrates; and
a pixel electrode formed on the other substrate opposing the counter electrode, wherein:
a plurality of branch lines are routed so as to pass through an area where the pixel electrode of the pixel is formed; and
areas over which the branch lines as projected onto the pixel electrode overlap the pixel electrode are equal to each other.

32. The liquid crystal panel according to claim 19, comprising:
a liquid crystal layer;
a pair of substrates with the liquid crystal layer interposed therebetween;
a counter electrode formed on one of the pair of substrates; and
a pixel electrode formed on the other substrate opposing the counter electrode, wherein:
a plurality of branch lines are routed so as to pass through an area where the pixel electrode of the pixel is formed; and
a largest value of areas over which the branch lines as projected onto the pixel electrode overlap the pixel electrode is less than or equal to twice a smallest value thereof.

33. The liquid crystal panel according to claim 19, comprising:
a liquid crystal layer;
a pair of substrates with the liquid crystal layer interposed therebetween;
a counter electrode formed on one of the pair of substrates; and
a pixel electrode formed on the other substrate opposing the counter electrode, wherein:
the branch lines are routed so as to pass through an area where the pixel electrode of the pixel is formed; and
$Cx/(Clc+Cs+Cx) \leq 0.2$ holds, where
Clc is a capacitance formed by the counter electrode and the pixel electrode,
Cs is a capacitance of the storage capacitor, and
Cx is a capacitance formed between the branch line and the pixel electrode.

34. The liquid crystal panel according to claim 19, comprising:
a liquid crystal layer;
a pair of substrates with the liquid crystal layer interposed therebetween;
a counter electrode formed on one of the pair of substrates; and
a pixel electrode formed on the other substrate opposing the counter electrode,
wherein a gap is formed between the pixel electrodes and the branch line is routed so as to pass through the gap.

35. The liquid crystal panel according to claim 19, wherein:
each pixel includes subordinate pixels having different brightness levels;
the subordinate pixels having different brightness levels include storage capacitors connected to different storage capacitor lines; and
the storage capacitors provided in the subordinate pixels having different brightness levels receive a pair of control signals whose signal voltage changes are of opposite directions and of an equal amount through the different storage capacitor lines.

36. A liquid crystal display device comprising the liquid crystal panel according to claim 19.

37. A liquid crystal TV comprising the liquid crystal display device according to claim 36.

38. The liquid crystal panel according to claim 1, wherein the edge portion is provided on at least one substrate of a pair of substrates between which the pixel region is provided.

* * * * *